(12) United States Patent
Kondo et al.

(10) Patent No.: US 7,116,372 B2
(45) Date of Patent: Oct. 3, 2006

(54) METHOD AND APPARATUS FOR DEINTERLACING

(75) Inventors: Satoshi Kondo, Kyoto (JP); Tetsuya Itani, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 714 days.

(21) Appl. No.: 09/981,794

(22) Filed: Oct. 19, 2001

(65) Prior Publication Data

US 2002/0047919 A1    Apr. 25, 2002

(30) Foreign Application Priority Data

Oct. 20, 2000 (JP) ............................. 2000-320596
Nov. 24, 2000 (JP) ............................. 2000-358082

(51) Int. Cl.
   *H04N 7/01* (2006.01)
(52) U.S. Cl. ................................................... 348/448
(58) Field of Classification Search ................ 348/452, 348/448, 451, 459, 458, 441, 699, 701, 625, 348/620

See application file for complete search history.

(56) References Cited

U.S. PATENT DOCUMENTS

| | | | | |
|---|---|---|---|---|
| 5,216,505 A | * | 6/1993 | Kageyama et al. ......... | 348/469 |
| 5,381,183 A | * | 1/1995 | Ishizuka et al. ............ | 348/458 |
| 5,410,356 A | * | 4/1995 | Kikuchi et al. ............. | 348/452 |
| 5,519,451 A | * | 5/1996 | Clatanoff et al. ........... | 348/606 |
| 5,532,750 A | * | 7/1996 | De Haan et al. ............ | 348/452 |
| 5,534,935 A | * | 7/1996 | Kawai et al. ................ | 348/448 |
| 5,793,435 A | * | 8/1998 | Ward et al. ................. | 348/448 |
| 5,917,554 A | * | 6/1999 | Ohta .......................... | 348/581 |
| 5,990,963 A | * | 11/1999 | Mishima et al. ........ | 375/240.24 |
| 5,995,154 A | * | 11/1999 | Heimburger ................ | 348/448 |
| 6,034,734 A | * | 3/2000 | De Haan et al. ........... | 348/458 |
| 6,259,480 B1 | * | 7/2001 | Yamauchi et al. .......... | 348/452 |
| 6,269,484 B1 | * | 7/2001 | Simsic et al. ............... | 725/151 |
| 6,331,874 B1 | * | 12/2001 | de Garrido et al. ......... | 348/452 |
| 6,343,100 B1 | * | 1/2002 | Fujiwara et al. ....... | 375/240.17 |
| 6,348,949 B1 | * | 2/2002 | McVeigh .................... | 348/452 |
| 6,418,233 B1 | * | 7/2002 | Kondo et al. ............... | 382/107 |
| 6,459,455 B1 | * | 10/2002 | Jiang et al. ................. | 348/452 |
| 6,630,961 B1 | * | 10/2003 | Shin et al. .................. | 348/448 |
| 6,757,022 B1 | * | 6/2004 | Wredenhagen et al. ..... | 348/452 |
| 2002/0027610 A1 | * | 3/2002 | Jiang et al. ................. | 348/448 |

FOREIGN PATENT DOCUMENTS

| | | |
|---|---|---|
| JP | 7-131761 | 5/1995 |
| JP | 10-126749 | 5/1998 |
| JP | 11-331782 | 11/1999 |

* cited by examiner

*Primary Examiner*—Paulous M. Natnael
(74) *Attorney, Agent, or Firm*—Wenderoth, Lind & Ponack, L.L.P.

(57) ABSTRACT

An apparatus and method for improving the VT filter performance for moving pictures by deinterlacing. A VT filter unit receives data of a deinterlacing target field (field #n) and data of forward and backward fields of the target field (fields #n−1 and #n+1). A difference operation unit receives data of two frames including the field #n, and calculates the sum of the absolute values of differences between these frames. A filter coefficient setting unit decides a filter coefficient based on the sum of the absolute values of the differences. The VT filter unit subjects the inputted pixels to the filtering by using the filter coefficient to generate an interpolation pixel, and outputs the generated interpolation pixel. A double-speed converter composes the interlaced image and the interpolation pixel to convert the frame rate to be doubled, and outputs the converted image as a progressive image.

35 Claims, 24 Drawing Sheets

METHOD AND APPARATUS FOR DEINTERLACING

FIELD OF THE INVENTION

The present invention relates to a deinterlacing method and deinterlacing apparatus for converting an interlaced image signal into a progressive image signal.

BACKGROUND OF THE INVENTION

In recent years, digital processing for images has been coming into wide use. As a method for compressively coding image data, high-efficiency coding such as MPEG (Moving Picture Experts Group) has been adopted. The high-efficiency coding is a technique for coding image data at a low bit rate so as to increase the efficiency of digital transmission, recording and the like.

In the current NTSC television broadcasts, an interlaced scanning method is adopted. According to the interlaced scanning method, one screen (one frame) is divided into a top field and a bottom field and is transmitted, thereby saving the bandwidth and enabling a high-efficiency transmission. However, line flicker and line crawling is conspicuous in the interlaced scanning method due to the high intensity and enlarged screen of the television receiver. Therefore, in some cases, deinterlacing for converting an interlaced image signal into a progressive image signal is performed by carrying out interpolation by using an image memory.

Japanese Published Patent Application No. Hei. 7-131761 (Document 1) discloses an example of a deinterlacing method for converting an interlaced image signal into a progressive image signal. This method is also called a VT filtering method. According to this VT filtering method, pixels in three successive fields, i.e., a field for which an interpolation pixel is generated and forward and backward fields, are subjected to a filtering process so as generate the interpolation pixel, and an interlaced image is converted into a progressive image by using the generated interpolation pixel. Hereinafter, this VT filtering method will be described with reference to FIG. 25.

FIG. 25 is a diagram schematically showing a state of an interlaced image on a time-vertical plane, in which a white dot shows a pixel (scan line). Here, a description is given of a filtering process in a case where a pixel in a position "k'" as shown in FIG. 25 is generated so as to perform interpolation.

In this case, by using the VT filtering method, pixels of three successive fields, i.e., a field including the position "k'" and forward and backward fields, for example 10 pixels "a'"–"j'" as shown in FIG. 25, are subjected to the filtering process, thereby generating the pixel of the position "k'". At that time, a filter having vertical low-pass characteristics for pixels in the same field (pixels "d'"–"g'") and vertical high-pass characteristics for pixels in adjacent fields (pixels "a'"–"c'" and "h'"–"j'") is used in the filtering process. The filter having such characteristics extracts vertical low-pass components from the pixels "d'"–"g'" and vertical high-pass components from the pixels "a'"–"c'" and "h'"–"j'". According to the VT filtering method, the low-pass components and high-pass components which are extracted by the filter are added so as to generate the interpolation pixel.

Japanese Published Patent Application No. Hei. 11-331782 (Document 2) discloses another example of the deinterlacing method. The method disclosed in this application is a method for implementing the deinterlacing method by a signal conversion apparatus having a still picture filter, a moving picture filter, a motion detection circuit and a mixer. According to this method, initially, the still picture filter and the motion picture filter respectively generate an interpolation pixel. Next, based on a result of detection by the motion detection circuit for detecting the motion of an image, the mixer mixes the interpolation signals that are outputted from the still picture filter and the moving picture filter so as to generate a final interpolation pixel. Then, by using the final interpolation pixel, the interlaced image is converted into a progressive image. Here, the motion detection circuit calculates a difference between frames and obtains the quantity of motion from the absolute value of the calculated difference.

Hereinafter, this deinterlacing method will be described with reference to FIG. 25. Here, a description is given of the filtering process in a case where a pixel in a position "k'" as shown in FIG. 25 is generated so as to perform interpolation.

According to this method, initially, the still picture filter subjects the pixels "b'", "e'", "f'" and "i'" to the filtering process so as to generate an interpolation pixel "k'", and the moving picture filter subjects the pixels "a'"–"j'" to the filtering process so as to generate an interpolation pixel "k'". Here, the filter coefficient of the still picture filter is set so that weights to the pixels "b'" and "i'" are the heaviest, and the filter coefficient of the moving picture filter is set so that weights to the pixels "d'", "e'", "f'" and "g'" are heavier. Next, the motion detection circuit detects a motion of the image from a difference between frames, and based on the detection result, the mixer mixes the interpolation signal that is outputted from the still picture filter and the interpolation signal that is outputted from the moving picture filter so as to generate the final interpolation pixel.

In the above description, the filtering process is performed for pixels in three fields, while the filtering process may be performed for pixels in two fields. In that case, the still picture filter subjects the pixels "e'", "f'" and "i'" to the filtering process, and the moving picture filter subjects the pixels "d'"–"j'" to the filtering process, thereby generating the interpolation pixel "k'".

As another example of the deinterlacing method, there is a method which detects a motion vector between a field that is subjected to the deinterlacing and its adjacent field, obtains an interpolation pixel from the adjacent field based on the detection result of the motion vector, and converts an interlaced image into a progressive image by using the interpolation pixel. According to this method, since the motion of the image is detected as the motion vector information, the interpolation process which almost matches the motion of the image can be performed, while the detection of the motion vector requires a massive quantity of signal processing.

Thus, Japanese Published Patent Application No. Hei. 10-126749 (Document 3) discloses a deinterlacing apparatus which implements a method for performing deinterlacing by using a motion vector, in which the quantity of processing for detecting the motion vector is reduced.

The deinterlacing apparatus disclosed in this application receives an interlaced image signal (MPEG video) that is coded by a coding method such as MPEG, and adaptively changes the interpolation method in the deinterlacing by utilizing information such as a structure of an image which is included in the MPEG video and a motion vector, whereby circuits such as a motion detection circuit and a motion vector detection circuit are omitted. Here, a description is given of a case where the MPEG video that is inputted to the deinterlacing apparatus is coded by a MPEG2 coding method.

The MPEG2 coding process includes an intra-frame coding and an inter-frame coding. When the intra-frame coding is performed to an interlaced image, the interlaced image is subjected to a DCT (Discrete Cosine Transformation) process, for example, in units of block (DCT block) being composed of 8×8 pixels, its spatial coordinate components are converted into frequency components, and thereafter, a variable-length coding is performed.

On the other hand, when the inter-frame coding is performed to the interlaced image, differences between the image of the present frame and reference images of forward and backward frames are obtained as predicted errors, and the predicted errors are subjected to a DCT process, a quantization process and a variable-length coding process. Accordingly, the quantity of codes can be significantly decreased. However, in a case where the motion of the image is large, when the differences between the present image and the forward and backward images are simply obtained, the predicted errors may be large, and therefore, the quantity of codes may be adversely increased. Then, motion vectors between the reference images and the image of the present frame are detected, and the reference images are motion-compensated based on the motion vectors so as to obtain the differences from the image of the present frame, and as a result, the predicted errors are reduced so as to decrease the quantity of codes. Here, in the MPEG2 coding, one image (picture) which consists of one frame or one field is divided into macroblocks, where each macroblock is composed of 16 lines×16 pixels, and then the motion vector is detected in units of macroblock, thereby performing the motion compensation.

Among images which have been coded in the above-mentioned coding process, an intra-frame coded image that is obtained by predictive-coding image data in one frame is called an I picture, an inter-frame forward predictive-coded image that is obtained by coding image data by a predictive coding using a forward frame is called a P picture, and a bidirectionally predictive-coded image that is obtained by coding image data by a predictive coding using any of a forward frame, a backward frame, and bidirectional frames is called a B picture.

The coding of the interlaced image is performed in the following cases: (1) a case where images of top and bottom fields are directly coded, i.e., the coding is performed in states of field structure, and (2) a case where a frame image is made from top and bottom field images and the coding is performed in a state of frame structure. In the coding that is performed in the state of the field structure, the motion compensation prediction and the DCT coding are performed in units of field picture. On the other hand, in the coding in the state of the frame structure, the coding is performed in units of frame picture, and frame prediction, which uses a frame image as a reference image, and field prediction, which uses one of the top field image and the bottom field image as a reference image, are adopted as the motion compensation prediction.

Therefore, by decoding a code sequence of MPEG video which is coded as described above, the deinterlacing apparatus can obtain information such as the image structure at the coding of an interlaced image, the motion vector and the prediction mode. Then, the deinterlacing apparatus judges whether the decoded image data is a static area or a moving area based on the obtained information. When the deinterlacing apparatus judges that the image data is a static area, the deinterlacing apparatus performs the inter-field interpolation, and when the deinterlacing apparatus judges that the image data is a moving area, the deinterlacing apparatus performs the intra-field interpolation, thereby converting the interlaced image signal into a progressive image signal.

However, in the deinterlacing, the vertical resolution of the progressive image can be increased more so than in the case when the inter-field interpolation is employed, as compared to the case where the intra-field interpolation is employed. Therefore, even when the decoded image data is a moving area, the deinterlacing apparatus judges whether the inter-field interpolation can be performed or not. Here, the quantity of motion of the motion vector at the coding which is included in the MPEG video is calculated, and when the quantity of motion is equivalent to even-numbered pixels, it is judged that the inter-field interpolation can be performed. Then, when it is judged that the inter-field interpolation can be performed even in a moving area, the inter-field interpolation is performed based on the motion vector, and as a result, the vertical resolution of the converted progressive image can be increased.

However, according to the VT filtering method described in Document 1, the interpolation pixel is generated regardless of whether the interlaced image is a still picture or a moving picture. That is, the filtering process is always performed to pixels of three successive fields, i.e., a field for which an interpolation pixel is generated and forward and backward fields. Thus, in the case of a still picture, a high-resolution progressive image can be generated. On the other hand, in the case of a moving picture, the correlation between the field for which the interpolation pixel is generated and the forward and backward fields is low, and thus, when pixels of the forward and backward fields are subjected to the filtering process to generate the interpolation pixel, degradation of the image quality may occur. Particularly in a case where video including an oblique edge moves vertically or the like, degradation occurs; for example, the edge looks jagged.

In addition, according to the method described in Document 2, two kinds of filters, i.e., the still picture filter and the moving picture filter, are required for generating an interpolation pixel, and as a result of requiring these two kinds of filters, the circuit scale is adversely increased.

Further, generally, according to the MPEG2 coding method, when an interlaced image is motion-compensated and then predictive-coded, a motion vector between frames which are one to three frames away from each other is detected, and a reference image is motion-compensated by using the motion vector. Therefore, when the deinterlacing apparatus performs the inter-field interpolation by directly using the motion vector that is obtained at the decoding of MPEG video, an interpolation pixel may be obtained from a frame that is several frames apart from the target frame. When a motion vector is used at the motion compensation in the coding, even when its detection accuracy is low, only the coding efficiency is slightly worsened and the image quality is not remarkably degraded. Therefore, there is no problem when the interpolation pixel is obtained from a frame that is several frames apart from the target frame. However, in the deinterlacing that performs interpolation of pixels based on a motion vector, the motion vector should be detected with a higher accuracy. Therefore, in the deinterlacing apparatus described in Document 3, when an interpolation pixel is obtained by directly using a motion vector at the motion compensation in the coding, the interpolation pixel may be obtained from a frame that is several frames apart from the target frame, and thus, an erroneous interpolation pixel may be generated.

SUMMARY OF THE INVENTION

An object of the present invention is to provide a deinterlacing method and a deinterlacing apparatus which can generate a progressive image of a high solution for a still picture and which can generate progressive image having no degradation of the image quality for a moving picture with a small scale of a circuit structure.

Another object of the present invention is to provide a deinterlacing method and a deinterlacing apparatus which can generate an interpolation pixel at a high accuracy, even when the deinterlacing is performed by using a motion vector that is obtained by decoding a code sequence of MPEG video.

Other objects and advantages of the present invention will become more apparent from the following detailed description. Specific embodiments described herein are provided only for illustration since various additions and modifications within the spirit and scope of the present invention will be apparent to those of skill in the art from the detailed description.

According to a first aspect of the present invention, there is provided a deinterlacing method for converting an interlaced image into a progressive image. The deinterlacing method of the first aspect comprises the steps of: performing a filtering process to pixels of at least one of three fields, a deinterlacing target field to be subjected to a deinterlacing process and forward and backward fields of the deinterlacing target field within the interlaced image so as to generate an interpolation pixel for the deinterlacing target field; measuring a quantity of motion of the deinterlacing target field; and changing characteristics of the filtering process based on the measured quantity of the motion.

According to a second aspect of the present invention, in accordance with the deinterlacing method of the first aspect, a filter which is used for the filtering process in the step of generating the interpolation pixel has characteristics of extracting vertical low frequency components of the deinterlacing target field, and extracting vertical high frequency components of the forward and backward fields of the deinterlacing target field.

According to a third aspect of the present invention, in accordance with the deinterlacing method of the first aspect, in the step of generating the interpolation pixel, pixels in the deinterlacing target field or in peripheral fields, which are in the same horizontal position as that of a position to be interpolated, are subjected to the filtering process.

According to a fourth aspect of the present invention, in accordance with the deinterlacing method of the first aspect, in the step of measuring the quantity of the motion of the deinterlacing target field, the quantity of the motion is obtained from a difference between the deinterlacing target field or a frame including the deinterlacing target field, and another field or frame.

According to a fifth aspect of the present invention, in accordance with the deinterlacing method of the first aspect, in the step of measuring the quantity of the motion of the deinterlacing target field, the quantity of the motion is obtained from a difference between the pixels which are used when the filtering process is performed in the step of generating the interpolation pixels.

According to a sixth aspect of the present invention, in accordance with the deinterlacing method of the fifth aspect, in the step of measuring the quantity of the motion of the deinterlacing target field, the quantity of the motion is obtained from a difference between pixels which are included in the forward and backward fields of the deinterlacing target field from among the pixels which are used when the filtering process is performed in the step of generating the interpolation pixels.

According to a seventh aspect of the present invention, in accordance with the deinterlacing method of the first aspect, in the step of changing characteristics of the filtering process, the characteristics of the filtering are changed so that the gain of components from the forward and backward fields of the deinterlacing target field is reduced as the measured quantity of the motion is increased.

According to an eighth aspect of the present invention, in accordance with the deinterlacing method of the first aspect, in the step of changing characteristics of the filtering process, the characteristics of the filtering are changed so that the gain of components from the forward and backward fields of the deinterlacing target field is reduced to zero when the measured quantity of the motion is large.

According to a ninth aspect of the present invention, there is provided a deinterlacing apparatus for converting an interlaced image into a progressive image. The deinterlacing apparatus of the ninth aspect comprises: a frame memory for storing the interlaced image; a filter unit for receiving, from the frame memory, a deinterlacing target field to be subjected to a deinterlacing process and one or both of forward and backward fields of the deinterlacing target field within the interlaced image, and performing a filtering process to pixels of at least one of the received fields so as to generate an interpolation pixel for the deinterlacing target field; a difference operation unit for measuring a quantity of motion of the deinterlacing target field; and a filter coefficient setting unit for changing characteristics of the filter unit based on the quantity of the motion measured by the difference operation unit.

According to a tenth aspect of the present invention, there is provided a deinterlacing apparatus for converting an interlaced image into a progressive image. The deinterlacing apparatus of the tenth aspect comprises: a frame memory for storing the interlaced image; a filter unit for receiving, from the frame memory, a deinterlacing target field to be subjected to a deinterlacing process and one or both of forward and backward fields of the deinterlacing target field within the interlaced image, and performing a filtering process to pixels of at least one of the received fields so as to generate an interpolation pixel for the interlacing target field; a difference operation unit for receiving, from the frame memory, the deinterlacing target field or a frame including the deinterlacing target field, and a field or frame which is adjacent to the deinterlacing target field or frame including the deinterlacing target field within the interlaced image, and operating a difference therebetween so as to measure a quantity of motion of the deinterlacing target field; a filter coefficient setting unit for changing filter characteristics of the filter unit based on the quantity of the motion measured by the difference operation unit; and a double-speed converter for composing the interlaced image and the interpolation pixel which are generated by the filter unit, and generating the progressive image.

According to an eleventh aspect of the present invention, there is provided a deinterlacing method for performing a decoding process to a code sequence, field by field or frame by frame, which code sequence is obtained by coding an interlaced image that is composed of plural fields by using motion compensation, and converting a decoded image of the interlaced image, which is obtained by the decoding process, into a progressive image. The deinterlacing method of the eleventh aspect comprises: a decoding step of decoding the interlaced image so as to obtain the decoded image and to obtain a motion vector at the motion compensation which indicates a prescribed reference field for a target field; a motion vector conversion step of converting a motion vector for each of the fields, having a size corresponding to a time interval between the target field and the prescribed reference field, into a motion vector of a size corresponding to a time interval of a fixed unit; an inter-field interpolation pixel generation step of obtaining pixels from reference fields which are forward and backward fields of a deinterlacing target field to be subjected to a deinterlacing process based on the motion vectors which are converted in the motion vector conversion step, and generating a first interpolation pixel for the deinterlacing target field; an intra-field interpolation pixel generation step of generating a second interpolation pixel by using pixels in the deinterlacing target field; a weighting factor decision step of deciding a weighting factor which indicates a weighting ratio between the first interpolation pixel and the second interpolation pixel; and a progressive image generation step of obtaining a weighted mean of the first interpolation pixel and the second interpolation pixel by using the weighting factor so as to generate a third interpolation pixel, and interpolating the decoded image by using the third interpolation pixel so as to generate the progressive image.

According to a twelfth aspect of the present invention, there is provided a deinterlacing method for performing a decoding process to a code sequence, field by field or frame by frame, which code sequence is obtained by coding an interlaced image that is composed of plural fields by using motion compensation, and converting an decoded image of the interlaced image, which is obtained by the decoding process, into a progressive image. The deinterlacing method of the twelfth aspect comprises: a decoding step of decoding the interlaced image so as to obtain the decoded image and to obtain a motion vector at the motion compensation which indicates a prescribed reference field for a target field; a motion vector conversion step of converting a motion vector for each of the fields having a size corresponding to a time interval between the target field and the prescribed reference field into a motion vector of a size corresponding to a time interval of a fixed unit; a motion vector judgment step of judging the effectiveness of the motion vectors which are converted in the motion vector conversion step; an inter-field interpolation pixel generation step of obtaining pixels from reference fields which are forward and backward fields of a deinterlacing target field to be subjected to a deinterlacing process based on the motion vectors which are converted in the motion vector conversion step and a result of the judgment in the motion vector judgment step, and generating a first interpolation pixel for the deinterlacing target field; an intra-field interpolation pixel generation step of generating a second interpolation pixel by using pixels in the deinterlacing target field; a weighting factor decision step of deciding a weighting factor which indicates a weighting ratio between the first interpolation pixel and the second interpolation pixel; and a progressive image generation step of obtaining a weighted mean of the first interpolation pixel and the second interpolation pixel by using the weighting factor so as to generate a third interpolation pixel, and interpolating the decoded image using the third interpolation pixel so as to generate the progressive image.

According to a thirteenth aspect of the present invention, in accordance with the deinterlacing method of the eleventh or twelfth aspect, the time interval of a fixed unit in the motion vector conversion step is a time interval equivalent to one field.

According to a fourteenth aspect of the present invention, in accordance with the deinterlacing method of the eleventh or twelfth aspect, processes in the inter-field interpolation pixel generation step, the weighting factor decision step and the progressive image generation step are carried out in units, which unit is smaller than a unit of an image that is accompanied by the motion vector at the motion compensation.

According to a fifteenth aspect of the present invention, in accordance with the deinterlacing method of the eleventh or twelfth aspect, the code sequence is a code sequence which is coded by an MPEG method.

According to a sixteenth aspect of the present invention, in accordance with the deinterlacing method of the eleventh or twelfth aspect, in the motion vector conversion step, when a distance between lines in a frame structure is one pixel, the motion vector is converted so that vertical components of the motion vector have an even number.

According to a seventeenth aspect of the present invention, in accordance with the deinterlacing method of the twelfth aspect, in the motion vector judgment step, when the size of the motion vector which is converted in the motion vector conversion step is equal to or smaller than a predetermined value, the motion vector is judged to be effective.

According to an eighteenth aspect of the present invention, in accordance with the deinterlacing method of the twelfth aspect, in the motion vector judgment step, when a distance between lines in a frame structure is one pixel, a motion vector which has even-numbered vertical components from among the motion vectors which are converted in the motion vector conversion step is judged to be effective.

According to a nineteenth aspect of the present invention, in accordance with the deinterlacing method of the eleventh aspect, in the inter-field interpolation pixel generation step, an evaluation scale for selecting an optimum motion vector for the generation of the first interpolation pixel is calculated by using the motion vectors which are converted in the motion vector conversion step, and the first interpolation pixel is generated by using a motion vector with which a best evaluation scale is obtained.

According to a twentieth aspect of the present invention, in accordance with the deinterlacing method of the eleventh aspect, in the inter-field interpolation pixel generation step, an evaluation scale for selecting an optimum motion vector for the generation of the first interpolation pixel is calculated by using the motion vector which is converted in the motion vector conversion step and a motion vector that is in the opposite direction to the motion vector, and the first interpolation pixel is generated by using a motion vector with which a best evaluation scale is obtained. Further, the motion vector in the opposite direction is a motion vector which is in the opposite direction to the motion vector that is converted in the motion vector conversion step and indicates a reference field in an opposite forward/backward relationship to the reference field which is indicated by the motion vector with respect to the target field.

According to a twenty-first aspect of the present invention, in accordance with the deinterlacing method of the twelfth aspect, in the inter-field interpolation pixel generation step, an evaluation scale for selecting an optimum motion vector for the generation of the first interpolation pixel is calculated by using a motion vector which is judged to be effective in the motion vector judgment step, among the motion vectors which are converted in the motion vector conversion step, and the first interpolation pixel is generated by using a motion vector with which a best evaluation scale is obtained.

According to a twenty-second aspect of the present invention, in accordance with the deinterlacing method of the twelfth aspect, in the inter-field interpolation pixel generation step, an evaluation scale for selecting an optimum motion vector for the generation of the first interpolation pixel is calculated by using an effective motion vector which is judged to be effective in the motion vector judgment step and a motion vector which is in the opposite direction to the effective motion vector, among the motion vectors converted in the motion vector conversion step, and the first interpolation pixel is generated by using a motion vector with which a best evaluation scale is obtained. Further, the motion vector in the opposite direction is a motion vector which is in the opposite direction to the effective motion vector and indicates a reference field in an opposite forward/backward relationship to the reference field which is indicated by the effective motion vector with respect to the target field.

According to a twenty-third aspect of the present invention, in accordance with the deinterlacing method of any one of the nineteenth through twenty-second aspects, in the inter-field interpolation pixel generation step, an evaluation scale for selecting an optimum motion vector for the generation of the first interpolation pixel is calculated by using the motion vector which is converted in the motion vector conversion step and a motion vector having no motion, and the first interpolation pixel is generated by using a motion vector with which a best evaluation scale is obtained.

According to a twenty-fourth aspect of the present invention, in accordance with the deinterlacing method of any one of the nineteenth through twenty-second aspects, the evaluation scale is a sum of the absolute values of differences between pixels of the reference field which is indicated by the motion vector that is converted in the motion vector conversion step and the second interpolation pixels.

According to a twenty-fifth aspect of the present invention, in accordance with the deinterlacing method of the twenty-third aspect, the evaluation scale is a sum of the absolute values of differences between pixels of the reference field which is indicated by the motion vector that is converted in the motion vector conversion step and the second interpolation pixels.

According to a twenty-sixth aspect of the present invention, in accordance with the deinterlacing method of any one of the twentieth through twenty-second aspects, the evaluation scale is a sum of the absolute values of differences between pixels of the reference field which is indicated by the motion vector that is converted in the motion vector conversion step and pixels of a reference field which is indicated by the motion vector in the opposite direction.

According to a twenty-seventh aspect of the present invention, in accordance with the deinterlacing method of any one of the twentieth through twenty-second aspects, in the inter-field interpolation pixel generation step, an evaluation scale for selection an optimum motion vector for the generation of the first interpolation pixel is calculated by using the motion vector that is converted in the motion vector conversion step and a motion vector having no motion, and the first interpolation pixel is generated by using a motion vector with which a best evaluation scale is obtained. Further, the evaluation scale is a sum of the absolute values of differences between pixels of the reference field which is indicated by the motion vector that is converted in the motion vector conversion step and pixels of the reference field which is indicated by the motion vector of the opposite direction.

According to a twenty-eight aspect of the present invention, there is provided a deinterlacing method for generating an interpolation pixel for an interlaced image which is composed of plural fields, by using pixels in each of the fields, and converting the interlaced image into a progressive image. The deinterlacing method of the twenty-eighth aspect comprises: an edge detection step of detecting a direction that is indicated by a line passing through a position to be interpolated where the interpolation pixel is generated and connecting peripheral pixels of the position to be interpolated, as a direction of an edge; an edge reliability decision step of obtaining a strongness of a correlation between pixels existing in the direction of the edge, as a reliability of the edge; and an interpolation pixel generation step of generating the interpolation pixel by using the pixels existing in the direction of the edge when the reliability of the edge is equal to or larger than a predetermined value, and generating the interpolation pixel by using pixels existing in upper and lower directions of the position to be interpolated when the reliability of the edge is smaller than the predetermined value.

According to a twenty-ninth aspect of the present invention, in accordance with the deinterlacing method of the eleventh or twelfth aspect, the intra-field interpolation pixel generation step includes: an edge detection step of detecting a direction that is indicated by a line passing through a position to be interpolated where the second interpolation pixel is generated and connecting peripheral pixels of the position to be interpolated, as a direction of an edge; an edge reliability decision step of obtaining a strongness of a correlation between pixels existing in the direction of the edge, as a reliability of the edge; and an interpolation pixel generation step of generating the second interpolation pixel by using the pixels existing in the direction of the edge when the reliability of the edge is equal to or larger than a predetermined value, and generating the second interpolation pixel by using pixels existing in upper and lower directions of the position to be interpolated when the reliability of the edge is smaller than the predetermined value.

According to a thirtieth aspect of the present invention, in accordance with the deinterlacing method of the twenty-eighth aspect, in the edge reliability decision step, when a difference between the pixels existing in the direction of the edge is smaller than a difference between the pixels existing in the upper and lower directions of the position to be interpolated, the reliability of the edge is judged to be equal to or larger than the predetermined value.

According to a thirty-first aspect of the present invention, in accordance with the deinterlacing method of the twenty-ninth aspect, in the edge reliability decision step, when a difference between the pixels existing in the direction of the edge is smaller than a difference between the pixels existing in the upper and lower directions of the position to be interpolated, the reliability of the edge is judged to be equal to or larger than the predetermined value.

According to a thirty-second aspect of the present invention, in accordance with the deinterlacing method of the twenty-eighth aspect, in the edge reliability decision step, when the interpolation pixel value which is obtained by using the pixels existing in the direction of the edge is a value between the values of the pixels existing in the upper and lower directions of the position to be interpolated, the reliability of the edge is judged to be equal to or larger than the predetermined value.

According to a thirty-third aspect of the present invention, in accordance with the deinterlacing method of the twenty-ninth aspect, in the edge reliability decision step, when the interpolation pixel value which is obtained by using the pixels in the direction of the edge is a value between the values of the pixels existing in the upper and lower directions of the position to be interpolated, the reliability of the edge is judged to be equal to or larger than the predetermined value.

According to a thirty-fourth aspect of the present invention, in accordance with the deinterlacing method of the eleventh or twelfth aspect, for an intra-coded deinterlacing target image area in the deinterlacing target field, the deinterlacing process is performed by using a motion vector which accompanies a peripheral image area that is positioned around the deinterlacing target image area or an image area in a frame immediately preceding or immediately following the deinterlacing target field, which image area is at the same position as the position of the deinterlacing target image area.

According to a thirty-fifth aspect of the present invention, in accordance with the deinterlacing method of the eleventh or twelfth aspect, when the code sequence which is decoded in the decoding step is recorded on a recording medium and read in a fast-forward or fast-rewind mode, the decoded image is interpolated by using only the second interpolation pixel that is generated in the intra-field interpolation pixel generation step so as to generate the progressive image.

According to a thirty-sixth aspect of the present invention, there is provided a deinterlacing apparatus for performing a decoding process to a code sequence, field by field or frame by frame, which code sequence is obtained by coding an interlaced image that is composed of plural fields by using motion compensation, and converting a decoded image of the interlaced image, which is obtained by the decoding process, into a progressive image. The deinterlacing apparatus of the thirty-sixth aspect comprises: a decoder for decoding the interlaced image so as to obtain the decoded image and to obtain a motion vector at the motion compensation which indicates a prescribed reference field for a target field; an image memory for storing the decoded image; a parameter memory for storing the motion vector; a motion vector converter for converting a motion vector for each of the fields, having a size corresponding to a time interval between the target field and the prescribed reference field, which is read from the parameter memory, into a motion vector of a size corresponding to a time interval of a fixed unit; an inter-field interpolation pixel generator for obtaining pixels from reference fields which are forward and backward fields of a deinterlacing target field to be subjected to a deinterlacing process based on the motion vectors which are converted by the motion vector converter, and generating a first interpolation pixel for the deinterlacing target field; an intra-field interpolation pixel generator for generating a second interpolation pixel by using pixels in the deinterlacing target field; a weighting factor decision unit for deciding a weighting factor which indicates a weighting ratio between the first interpolation pixel and the second interpolation pixel; and a progressive image generator for obtaining a weighted mean of the first interpolation pixel and the second interpolation pixel by using the decided weighting factor so as to generate a third interpolation pixel, and interpolating the decoded image that is read from the image memory by using the third interpolation pixel so as to generate the progressive image.

According to a thirty-seventh aspect of the present invention, there is provided a deinterlacing apparatus for performing a decoding process to a code sequence, field by field or frame by frame, which code sequence is obtained by coding an interlaced image that is composed of plural fields by using motion compensation, and converting a decoded image of the interlaced image, which is obtained by the decoding process, into a progressive image. The deinterlacing apparatus of the thirty-seventh aspect comprises: a decoder for decoding the interlaced image so as to obtain the decoded image and to obtain a motion vector at the motion compensation which indicates a prescribed reference field for a target field; an image memory for storing the decoded image; a parameter memory for storing the motion vector; a motion vector converter for converting a motion vector for each of the fields, having a size corresponding to a time interval between the target field and the prescribed reference field, which is read from the parameter memory, into a motion vector of a size corresponding to a time interval of a fixed unit; a motion vector judgment unit for judging the effectiveness of the motion vectors which are converted by the motion vector converter; an inter-field interpolation pixel generator for obtaining pixels from reference fields which are forward and backward fields of a deinterlacing target field to be subjected to a deinterlacing process based on the motion vectors which are converted by the motion vector converter and a result of the judgement by the motion vector judgement unit, and generating a first interpolation pixel for the deinterlacing target field; an intra-field interpolation pixel generator for reading pixels in the deinterlacing target field so as to generate a second interpolation pixel; a weighting factor decision unit for deciding a weighting factor which indicates a weighting ratio between the first interpolation pixel and the second interpolation pixel; and a progressive image generator for obtaining a weighted mean of the first interpolation pixel and the second interpolation pixel by using the weighting factor so as to generate a third interpolation pixel, and interpolating the decoded image that is read from the image memory by using the third interpolation pixel so as to generate the progressive image.

DETAILED DESCRIPTION OF THE INVENTION

Hereinafter, embodiments of the present invention will be described with reference to the drawings.

First Embodiment

Figure 1:
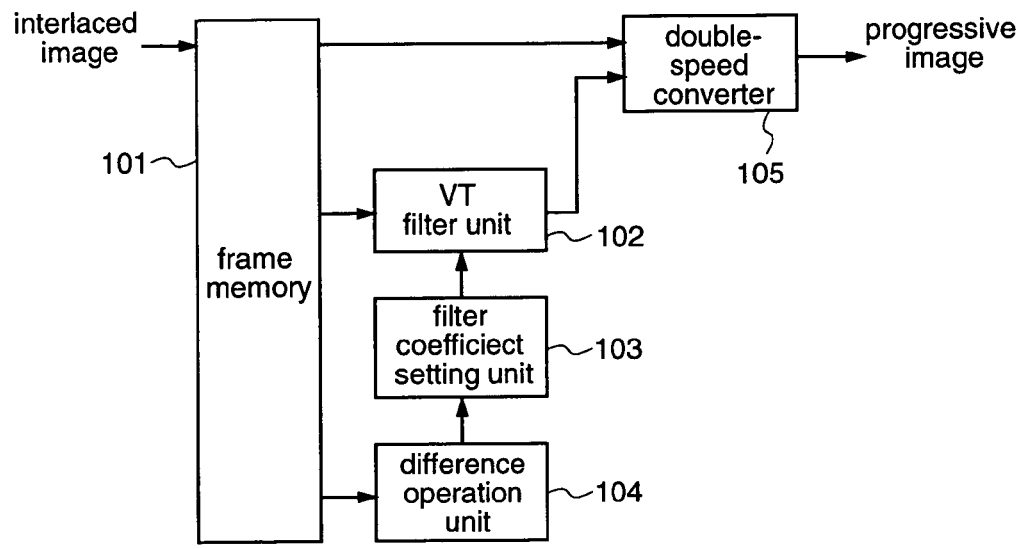
FIG. 1 is a block diagram illustrating a structure of a deinterlacing apparatus according to a first embodiment of the present invention.
Figure 2:
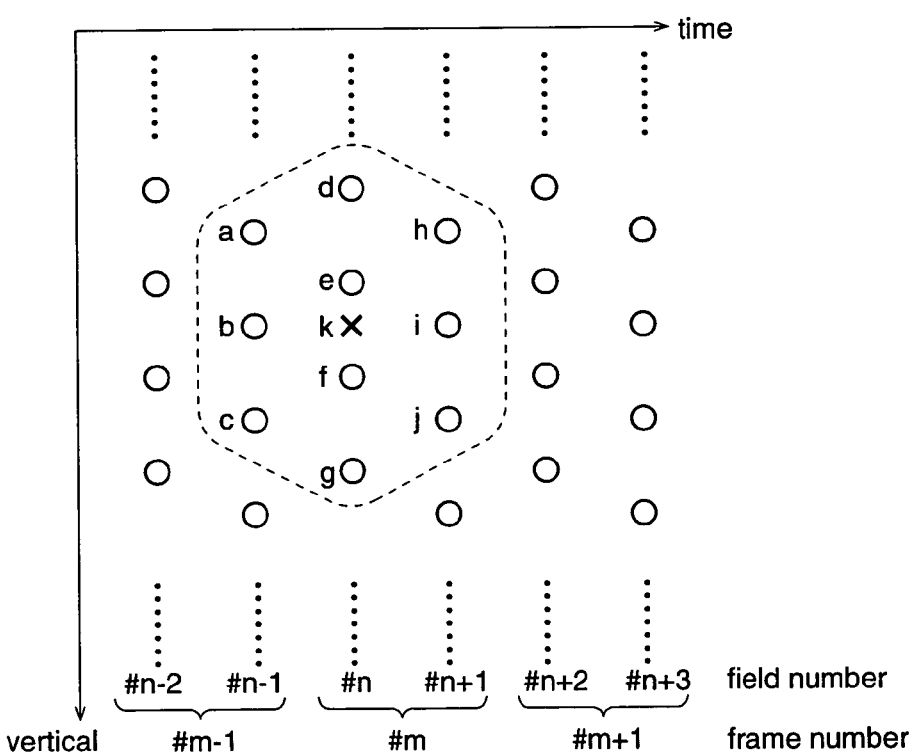
FIG. 2 is a schematic diagram for explaining an interlaced image.

Hereinafter, a first embodiment of the present invention will be described with reference to FIGS. 1 and 2. FIG. 1 is a block diagram illustrating a deinterlacing apparatus which includes a frame memory 101, a VT filter unit 102, a filter coefficient setting unit 103, a difference operation unit 104 and a double-speed converter 105. FIG. 2 is a diagram schematically showing a state of an interlaced image on a time-vertical plane, in which a white dot shows a pixel (scan line) and white dots that are arranged in the vertical direction show pixels in the same field.

Initially, the deinterlacing apparatus stores an inputted interlaced image in the frame memory 101. Here, a description is given of a case where fields #n−2 to #n+1 as shown in FIG. 2, i.e., four fields, are stored, and the field #n is subjected to deinterlacing.

In this case, the VT filter unit 102 receives data of the fields #n−1, #n and #n+1. Then, when an interpolation pixel in a position "k" as shown in FIG. 2 is to be generated, pixels which are adjacent to the position "k" are subjected to the filtering process. Here, pixels "a"–"j" are subjected to the filtering process.

In addition, the difference operation unit 104 receives data of two frames including the field #n (deinterlacing target), i.e., frames #m−1 and #m (fields #n−2 to #n+1) The difference operation unit 104 calculates a difference between the frames #m−1 and #m so as to obtain the quantity of motion of the frame #n. Difference values between positionally corresponding pixels in these frames are obtained, and the sum of the respective absolute values of the difference values is obtained as the quantity of motion. Then, the obtained result is outputted to the filter coefficient setting unit 103.

The filter coefficient setting unit 103 decides a filter coefficient based on the sum of the absolute values of the differences which are inputted from the difference operation unit 104. For example, thresholds TH1, TH2 and TH3 (assuming that TH1<TH2<TH3) are set, and when the sum of the absolute values of the differences is smaller than the threshold TH1, the interlaced image is judged to be a still picture. When the sum of the absolute values of the differences is equal to or larger than TH1 but smaller than TH2, the image is judged to be a quasi-still picture. When the sum of the absolute values of the differences is equal to or larger than TH2 but smaller than TH3, the image is judged to be a quasi-moving picture. When the sum of the absolute values of the differences is equal to or larger than TH3, the image is judged to be a moving picture. Then, the predetermined filter coefficient corresponding to each of a still picture, quasi-still picture, quasi-moving picture and moving picture is outputted to the VT filter unit 102.

Here, the filter coefficient setting unit 103 fundamentally sets the coefficient so that the VT filter unit 102 extracts vertical low frequency components from the deinterlacing target field and so that the VT filter unit 102 extracts vertical high frequency components from the field adjacent to the target field. For example, when an interpolation pixel "k" as shown in FIG. 2 is to be generated, the filter coefficient setting unit 103 sets the coefficient so that the VT filter unit 102 extracts vertical high frequency components from the pixels "a"–"c" and "h"–"j" and extracts vertical low frequency components from the pixels "d"–"g".

Figure 3A:
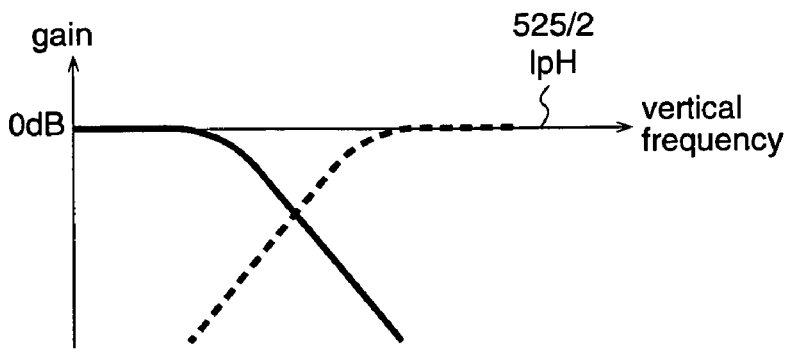
FIGS. 3(a) to 3(d) are schematic diagrams for explaining examples of frequency characteristics of a VT filter 102 according to embodiments of the present invention.
Figure 3B:
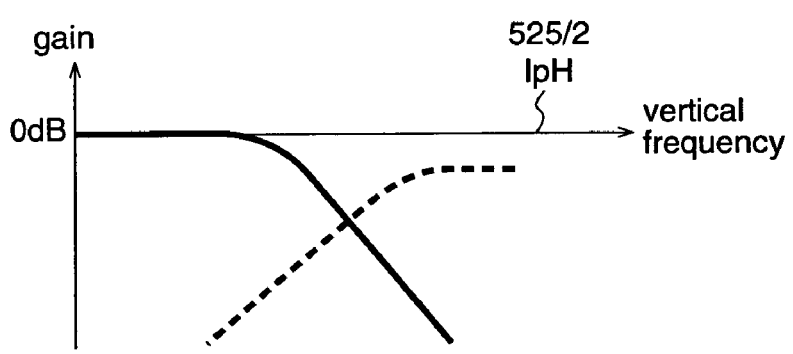
Figure 3C:
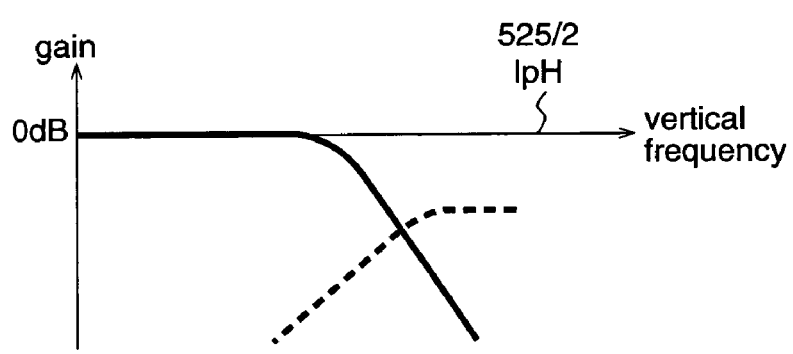
Figure 3D:
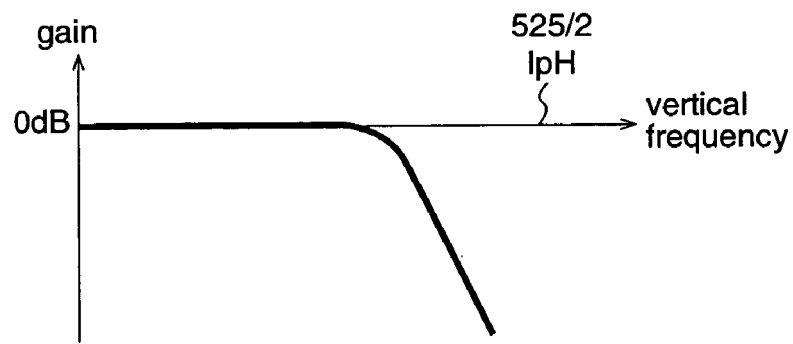

Further, the filter coefficient setting unit 103 sets the filter coefficient so that components (gain) from the adjacent fields are decreased in the order of still picture, quasi-still picture, quasi-moving picture, and moving picture. For example, in the case of a moving picture, the filter coefficient may be set so that the components (gain) from the adjacent fields become zero. Examples of the frequency characteristics of the VT filter unit 102 in this case are shown in FIGS. 3(a) to 3(d). FIGS. 3(a) to 3(d) are diagrams showing the gain with respect to the vertical frequency in the filter. FIG. 3(a) shows the case of a still picture, FIG. 3(b) shows the case of a quasi-still picture, FIG. 3(c) shows the case of a quasi-moving picture, and FIG. 3(d) shows the case of a moving picture. In FIGS. 3(a) to 3(d), the full line shows the filter characteristic to a deinterlacing target field, and the broken line shows the frequency characteristics to the adjacent field.

The VT filter unit 102 filters the inputted pixels by using the filter coefficient value which is inputted from the filter coefficient setting unit 103 so as to generate an interpolation pixel, and outputs the generated interpolation pixel. The generated interpolation pixel is inputted to the double-speed converter 105. The pixel data of the deinterlacing target field is inputted to the double-speed converter 105 from the frame memory 101, and the interpolation pixel data is inputted to the double-speed converter 105 from the VT filter unit 102. The double-speed converter 105 composes these data, converts the frame rate so as to be doubled, and outputs the converted data as a progressive image.

As described above, in this first embodiment, when an interlaced image is to be converted into a progressive image, the VT filter unit 102 subjects pixels of a deinterlacing target field and forward and backward fields to the VT filtering, thereby generating the interpolation pixel. At that time, the difference operation unit 104 obtains the sum of the absolute values of the differences between pixels of a frame including the deinterlacing target field and its immediately preceding frame, and the filter coefficient setting unit 103 decides the coefficient of the VT filter on the basis of the sum of the absolute values. The coefficient is decided so that the image is judged to be a moving picture when the sum of the absolute values of the differences is larger, and then the contribution (gain) from the adjacent fields is reduced.

Therefore, in the case of a still picture, a progressive image of high resolution can be obtained as in the case of using the prior art VT filtering method, and in the case of a moving picture, the image quality of a part whose image quality is degraded by the prior art VT filter can be greatly improved. Further, these operations can be implemented by one filter, whereby the costs can be reduced.

Further, in this first embodiment, the filter coefficient setting unit 103 judges which one of a still picture, quasi-still picture, quasi-moving picture and moving picture the interlaced image is, and, based on the absolute values of the differences which are inputted from the difference operation unit 104, the filter coefficient setting unit 103 sets the filter coefficient at four levels. Therefore, as compared to the prior art deinterlacing method by which the filtering coefficient is switched between two levels according to whether the interlaced image is a still picture or a moving picture, an interpolation pixel that more accurately matches the motion of the image can be generated.

In this first embodiment, when the quantity of motion of a deinterlacing target field is obtained, the difference operation unit 104 obtains the sum of the absolute values of the differences between a frame including the deinterlacing target field and the forward frame, while the difference operation unit 104 may obtain the sum of absolute values of differences between the deinterlacing target field and the forward field. Further, the difference operation unit 104 may obtain the sum of absolute values of the differences between the frame including the deinterlacing target field and a backward frame, or the difference operation unit 104 may obtain the sum of the absolute values of the differences between the deinterlacing target field and a backward field. Further, the difference operation unit 104 may obtain a larger one of the sums of the absolute values of the differences between the frame including the deinterlacing target field and the forward and backward frames or the sums of the absolute values of the differences between the deinterlacing target field and the forward and backward fields, or the mean value of these sums.

In addition, in this first embodiment, the VT filter unit 102 performs the filtering by using 10 pixels so as to generate an interpolation pixel, while the number of pixels is not limited to 10 and may be other values.

Further, in this first embodiment, the VT filter unit 102 generates an interpolation pixel of the field #n by using the pixels of three fields, i.e., the fields #n−1, #n and #n+1, while the interpolation pixel may be generated by using the pixels of two fields, such as fields #n−1 and #n, or fields #n and #n+1. Since the frame memory 101 contains the interlaced image in field units, the size of the frame memory 101 in this case can be reduced more as compared to the case where the interpolation pixel is generated by using the pixels of three fields, and the processing quantity at the filtering process can thereby be reduced.

In this first embodiment, the filter coefficient setting unit 103 decides the quantity of motion at four levels, while the number of levels is not limited to four and may be other values.

Furthermore, in this first embodiment, the quantity of motion is decided in field units or frame units, while the filter coefficient may be decided by dividing the screen into several areas and detecting the quantity of motion for each divided area.

Second Embodiment

Figure 4:
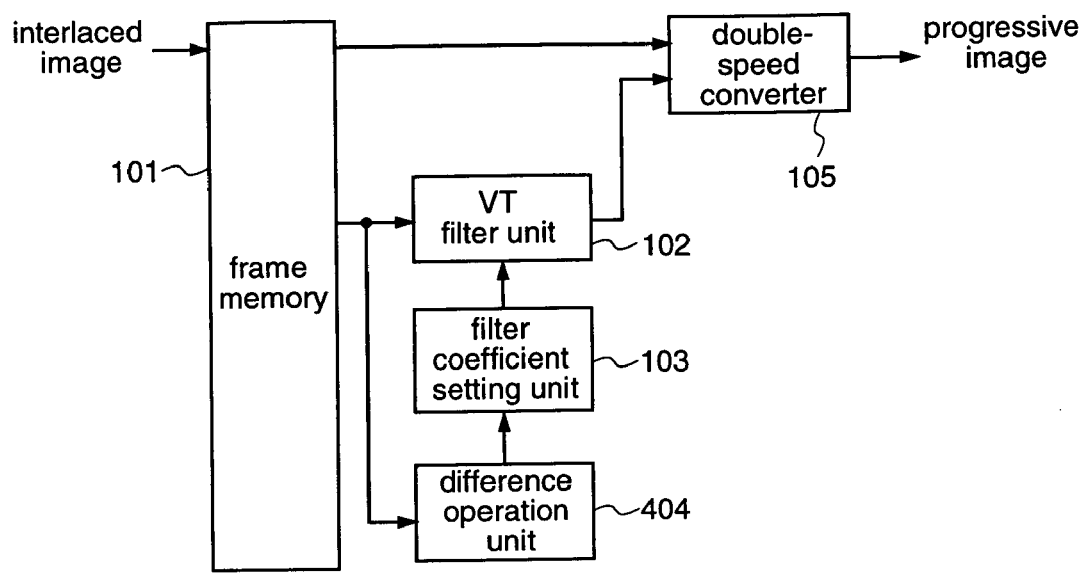
FIG. 4 is a block diagram illustrating a structure of a deinterlacing apparatus according to a second embodiment of the present invention.

Hereinafter, a second embodiment of the present invention will be described with reference to FIG. 4. FIG. 4 is a block diagram illustrating a deinterlacing apparatus which includes a frame memory 101, a VT filter unit 102, a filter coefficient setting unit 103, a difference operation unit 404, and a double-speed converter 105.

Initially, the deinterlacing apparatus stores an inputted interlaced image into the frame memory 101. Here, a description is given of a case where three fields, i.e., fields #n−1 to #n+1 as shown in FIG. 2 are stored, and the field #n is subjected to deinterlacing.

In this case, the VT filter unit 102 receives data of the fields #n−1, #n and #n+1. Then, when an interpolation pixel in a position "k" as shown in FIG. 2 is to be generated, for example, pixels "a"–"j" as the pixels adjacent to pixel "k", are subjected to the filtering process.

The difference operation unit 404 receives pixels "b" and "i" in the adjacent fields, which are at the same position as the position to be interpolated, among the pixels to be used by the VT filter unit 102 for the filtering process. The difference operation unit 404 calculates the absolute value of the difference between these pixel values. Then, the obtained result is outputted to the filter coefficient setting unit 103.

The filter coefficient setting unit 103 decides a filter coefficient based on the absolute value of the difference which is inputted from the difference operation unit 404. For example, thresholds TH1, TH2 and TH3 (assuming that TH1<TH2<TH3) are set, and when the absolute value of the difference is smaller than the threshold TH1, the interlaced image is judged to be a still picture. When the absolute value of the difference is equal to or larger than TH1 but smaller than TH2, the image is judged to be a quasi-still picture. When, the absolute value of the difference is equal to or larger than TH2 but smaller than TH3, the image is judged to be a quasi-moving picture. When the absolute value of the difference is equal to or larger than TH3, the image is judged to be a moving picture. Then, the predetermined filter coefficient corresponding to each of a still picture, quasi-still picture, quasi-moving picture and moving picture are outputted to the VT filter unit 102. As described above, in this second embodiment, the difference operation unit 404 obtains the absolute value of the difference between pixels in adjacent fields, which pixels are at the same position as the position to be interpolated. Therefore, the filter coefficient setting unit 103 can judge the quantity of motion for each pixel. Accordingly, when there is a moving object or the like in the screen, the image quality degradation which has been caused by the prior art VT filter can be prevented for that object. Here, the characteristics of the coefficient of the VT filter unit 102 are the same as those in the first embodiment.

The VT filter unit 102 subjects the inputted pixels to the filtering by using the filter coefficient values which are inputted from the filter coefficient setting unit 103 so as to generate an interpolation pixel, and outputs the generated interpolation pixel. The generated interpolation pixel is inputted to the double-speed converter 105. Pixel data of the deinterlacing field is inputted to the double-speed converter 105 from the frame memory 101, and the interpolation pixel data is inputted to the double-speed converter 105 from the VT filter unit 102. The double-speed converter 105 composes these data, converts the frame rate so as to be doubled, and outputs the converted data as a progressive image.

As described above, in this second embodiment, when an interlaced image is to be converted into a progressive image, the VT filter unit 102 filters pixels of a deinterlacing target field and forward and backward fields, thereby generating the interpolation pixel. At that time, the difference operation unit 404 calculates the absolute value of the difference between the pixels of its adjacent fields, which pixels are at the same position as a position to be interpolated, and the filter coefficient setting unit 103 decides the coefficient of the VT filter based on the calculated absolute value. The filter coefficient is decided so that the image is judged to be a moving picture when the absolute value of the difference is larger, and then, the contribution from the adjacent fields is reduced.

Therefore, in the case of a still picture, a progressive image of high resolution can be obtained as in the case of using the prior art VT filter, as well as when there is a moving object or the like in the screen, but the image quality degradation which is caused by the prior art VT filter can be prevented for that object. Further, these operations can be implemented by one filter, whereby the costs can be reduced.

In this second embodiment, the difference operation unit 404 calculates the difference between pixels "b" and "i", while a difference between other pixels may be calculated. For example, the sum of the absolute values of the differences between positionally corresponding pixels of the pixels "a"–"c" and pixels "h"–"j" may be calculated, or the absolute value of a difference between the mean value of the pixels "e" and "f" and the pixel "b" may be calculated.

Further, in this second embodiment, the VT filter unit 102 performs the filtering by using 10 pixels so as to generate the interpolation pixel. However, the number of pixels is not limited to 10 and may be other values.

In this second embodiment, the VT filter unit 102 generates the interpolation pixel of the field #n by using the pixels of the three fields, i.e. fields #n–1, #n and #n+1, while the interpolation pixel can be generated by using pixels of two fields such as fields #n–1 and #n, or fields #n and #n+1. In this case, since the frame memory 101 contains the interlaced image in field units, the size of the frame memory 101 can be reduced more and the processing quantity at the filtering process can be reduced more, as compared to the case where the interpolation pixel is generated by using pixels of three fields.

Furthermore, in this second embodiment, the filter coefficient setting unit 103 decides the quantity of motion at four levels, while the number of levels is not limited to four and may be other values.

Third Embodiment

Figure 5:
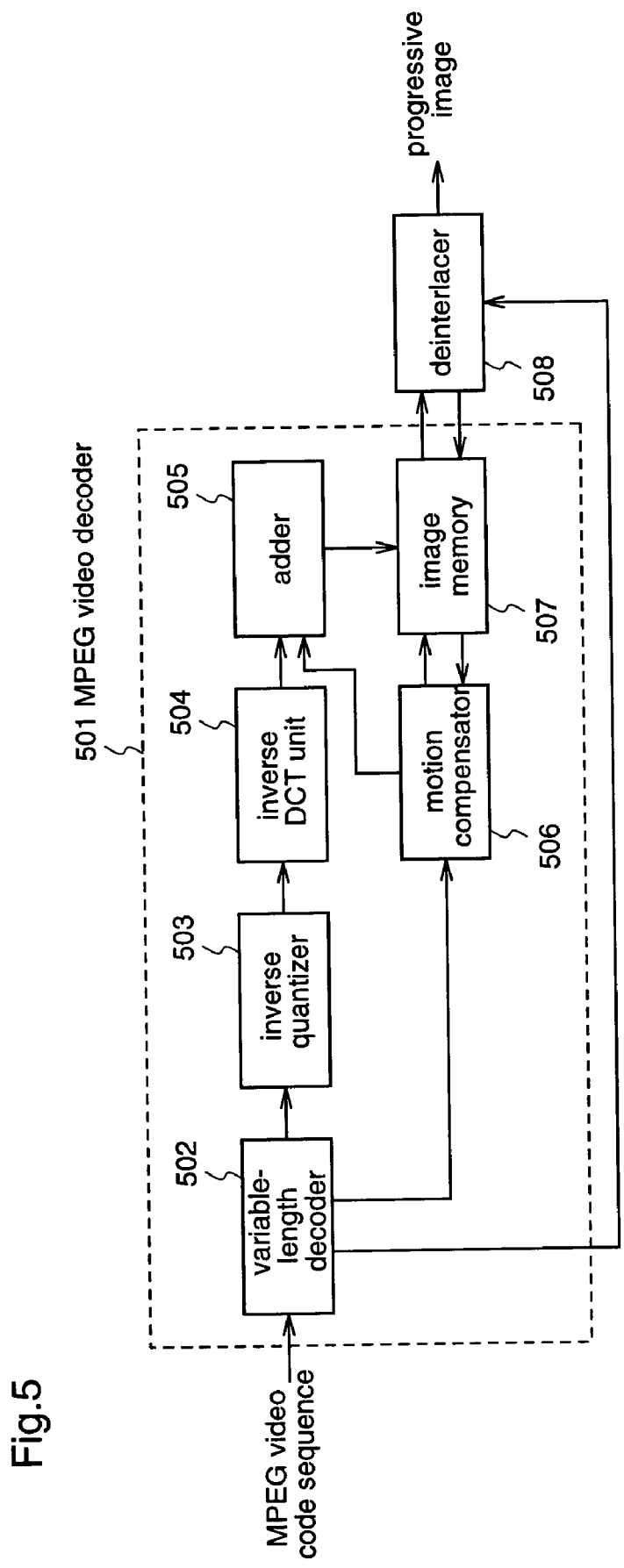
FIG. 5 is a block diagram illustrating a structure of a deinterlacing apparatus according to a third embodiment of the present invention.
Figure 6:
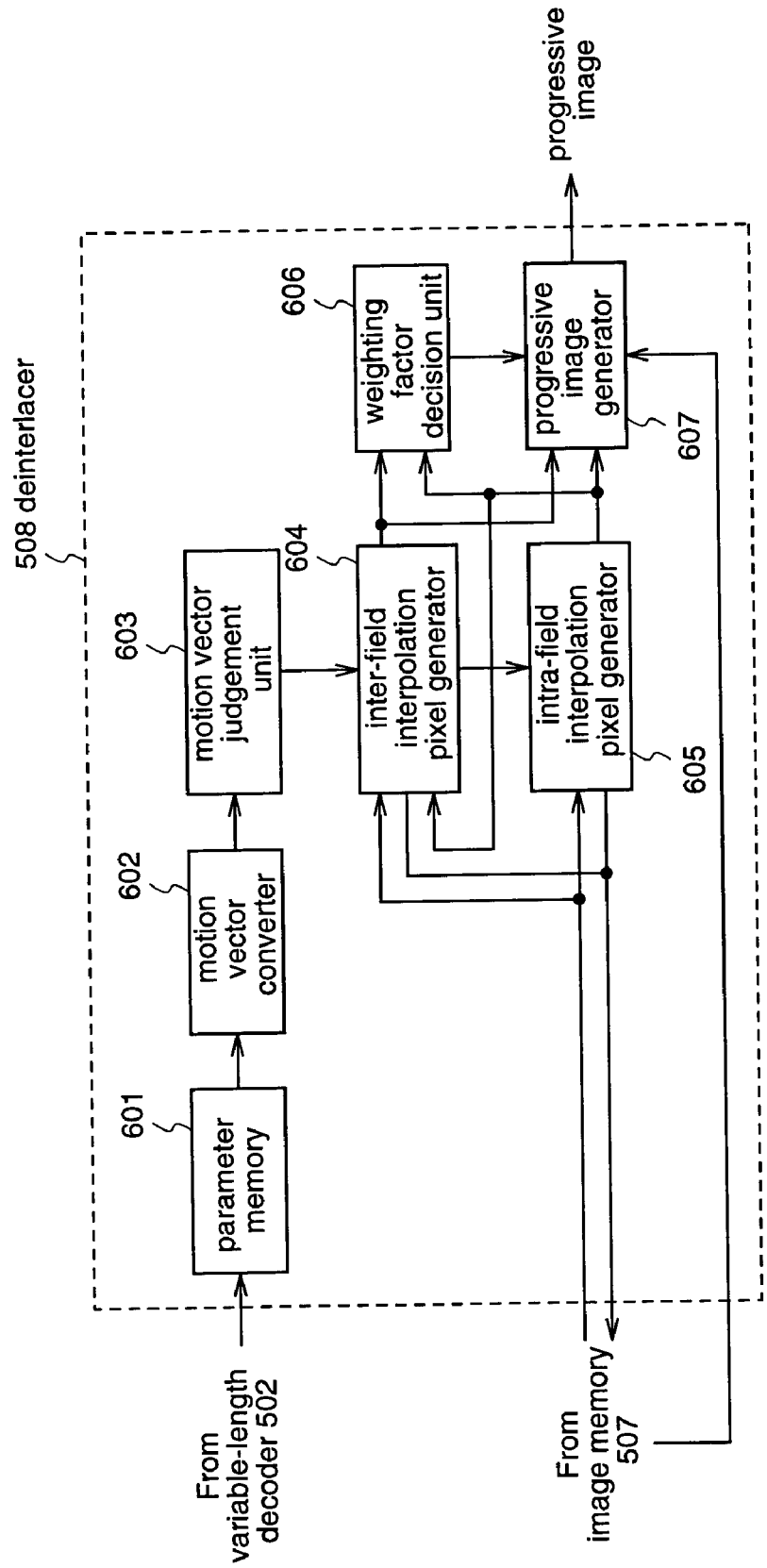
FIG. 6 is a block diagram illustrating a deinterlacer 508 according to embodiments of the present invention.

Hereinafter, a third embodiment of the present invention will be described. FIG. 5 is a block diagram illustrating a structure of a deinterlacing apparatus which includes a MPEG video decoder 501 and a deinterlacer 508. MPEG video which is obtained by motion-compensating and predictive coding an interlaced image according to the MPEG method is inputted to this deinterlacing apparatus. The MPEG video decoder 501 includes a variable-length decoder 502, an inverse quantizer 503, an inverse DCT unit 504, an adder 505, a motion compensator 506, and an image memory 507. FIG. 6 is a block diagram illustrating a structure of the deinterlacer 508, which includes a parameter memory 601, a motion vector converter 602, a motion vector judgement unit 603, an inter-field interpolation pixel generator 604, an intra-field interpolation pixel generator 605, a weighting factor decision unit 606, and a progressive image generator 607.

A MPEG video code sequence which is inputted to the MPEG video decoder 501 is subjected to variable-length decoding by the variable-length decoder 502. DCT coefficients and the like which are obtained by variable-length-decoding the MPEG video code sequence are outputted to the inverse quantizer 503. Further, the variable-length decoder 502 variable-length-decodes the MPEG video so as to obtain information such as the motion vector, picture type, macroblock type, temporal reference and motion vertical field selection (MVFS), and the variable-length decoder 502 outputs the obtained information to the motion compensator 506 and the deinterlacer 508. Here, the picture type information indicates which one of an I picture, a P picture and a B picture the decoded image data is. The macroblock type information indicates by which prediction mode (i.e., no prediction, forward prediction, backward prediction, bidirectional prediction or the like), for example, a macroblock having the size of 16×16 pixels among the decoded image data is coded. The temporal reference information indicates the frame number of a picture. Further, the MVFS information indicates whether a reference image in field prediction is a top or bottom field image in a case where an interlaced image is coded by the frame structure and the field prediction is used as the motion compensation prediction.

The inverse quantizer 503 subjects the inputted DCT coefficients to the inverse quantization. Then, the inverse DCT unit 504 subjects the obtained result of the inverse quantization to the inverse DCT process so as to generate image data, and outputs the generated image data to the adder 505.

The motion compensator 506 reads reference image data from the image memory 507 and motion-compensates the reference image data. As will be described later, decoded image data that is outputted from the adder 505 is stored in the image memory 507. This decoded image data is used as the reference image data for the motion compensation. Further, for example, according to the MPEG2 coding method, the image data is motion-compensated in units of macroblock (16×16 pixels). Thus, when the inputted code sequence is a code sequence which is coded by the MPEG2 coding method, the reference image data which is motion-compensated by the motion compensator 506 indicates a decoded macroblock (16×16 pixel data). When the decoded macroblock is an intra (intra-frame coded) macroblock, the motion compensator 506 does not operate. Further, when the decoded macroblock is a non-intra macroblock, the motion compensator 506 performs the motion compensation based on the motion vector which is inputted from the variable-length decoder 502, and outputs motion-compensated image data to the adder 505.

When the decoded macroblock is an intra macroblock, the adder 505 does not process the image data that is inputted from the inverse DCT unit 504 and outputs the image data as it is. On the other hand, when the decoded macroblock is a non-intra macroblock, the adder 505 adds the image data that is inputted from the inverse DCT unit 504 and the reference image data that is outputted from the motion compensator 506, and outputs the obtained result. The image data that is outputted from the adder 505 is stored in the image memory 507 as the decoded image data.

The deinterlacer 508 reads the decoded image data from the image memory 507 successively in the order of time, and processes the read image data. This operation will be described hereinafter.

The information such as the motion vector, picture type, temporal reference, macroblock type, and MVFS is inputted to the deinterlacer 508 from the variable-length decoder 502, and the decoded image data is inputted to the deinterlacer 508 from the image memory 507. The information, such as the motion vector, picture type, macroblock type, temporal reference and MVFS, that is inputted from the variable-length decoder 502 is inputted to the parameter memory 601 and temporarily stored. This is for the purpose of compensating the time difference, because the MPEG video decoder 501 processes each frame in the order of the code sequence while the deinterlacer 508 processes the image data in the order of time.

The motion vector converter 602 reads the information such as the motion vector, picture type, temporal reference, and MVFS from the parameter memory 601, and converts the size of the motion vector. Here, the motion vector converter 602 can obtain information as to how many fields the deinterlacing target field which is subjected to the deinterlacing and a reference field which has been referred to by the deinterlacing target field at the motion compensation in the coding are apart from each other based on the information of the picture type, temporal reference, and MVFS.

Hereinafter, the operation for converting the motion vector will now be described with reference to FIG. 7.

Figure 7:
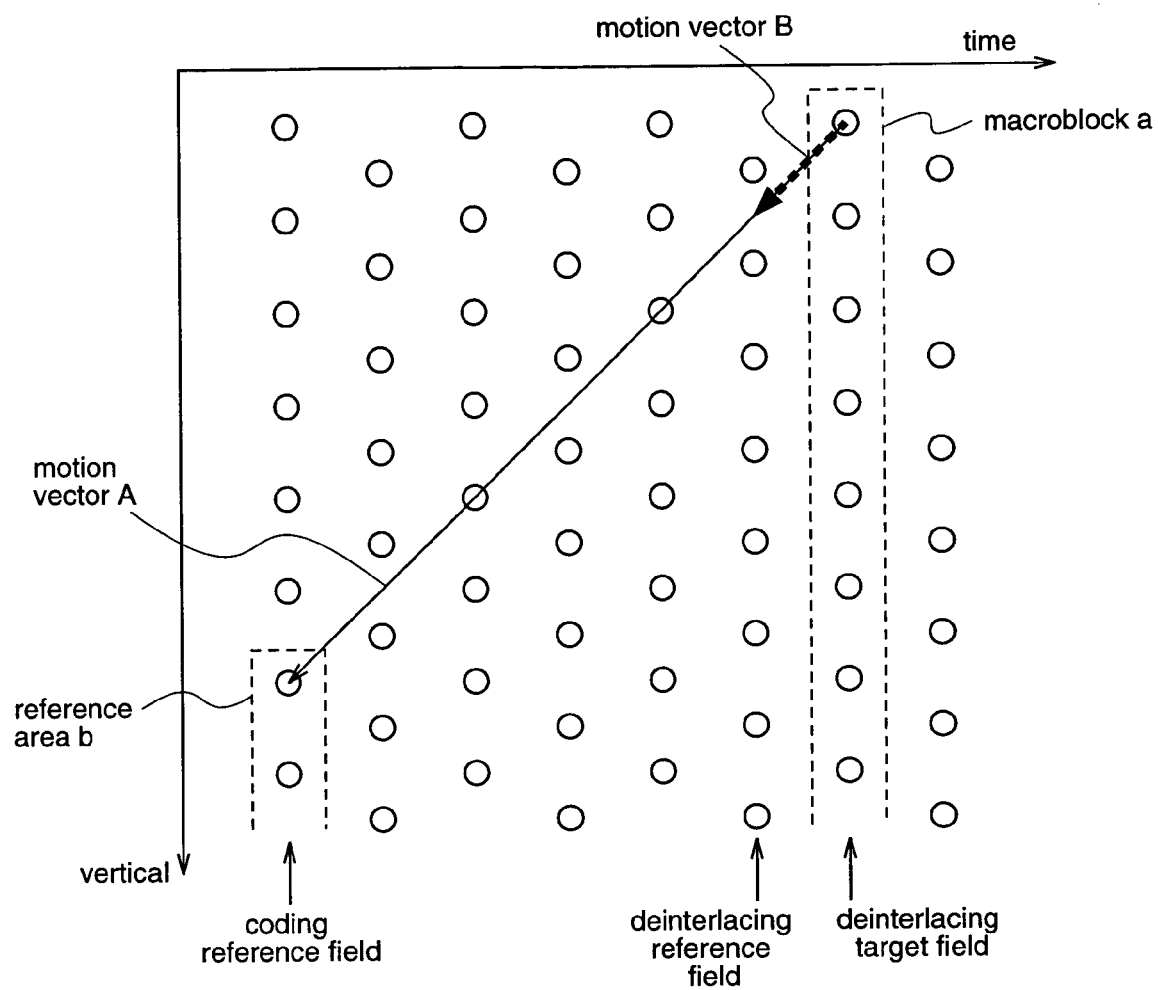
FIG. 7 is a schematic diagram illustrating a state of an interlaced image.

FIG. 7 is a diagram schematically showing a state of a decoded image (interlaced image). White dots show the arrangement of scan lines (pixels) that are seen from the horizontal direction of the screen, and the ordinate axis represents the vertical direction and the abscissa axis represents the time direction. That is, white dots that are arranged vertically in a line show scan lines (pixels) in the same field. Here, a description is given of a case where a motion vector of a macroblock "a" in a deinterlacing target field is converted. Assuming that the motion vector of the macroblock "a" is a motion vector "A", it means that the macroblock "a" has referred to a reference area "b" in a reference field which is three frames (six fields) apart from the target field at the coding. The motion vector converter 602 converts this motion vector "A" into a motion vector in one field unit. That is, the motion vector "A" is converted into a motion vector "B" which is shown in FIG. 7 by a broken line. Then, the converted motion vector is outputted to the motion vector judgement unit 603. Only the vertical motion is shown in FIG. 7, while the horizontal motion is similarly processed. Further, only the forward motion vector is shown in FIG. 7, while when the macroblock has a backward motion vector, the motion vector converter 602 carries out the same conversion process to the backward motion vector.

Figure 8:
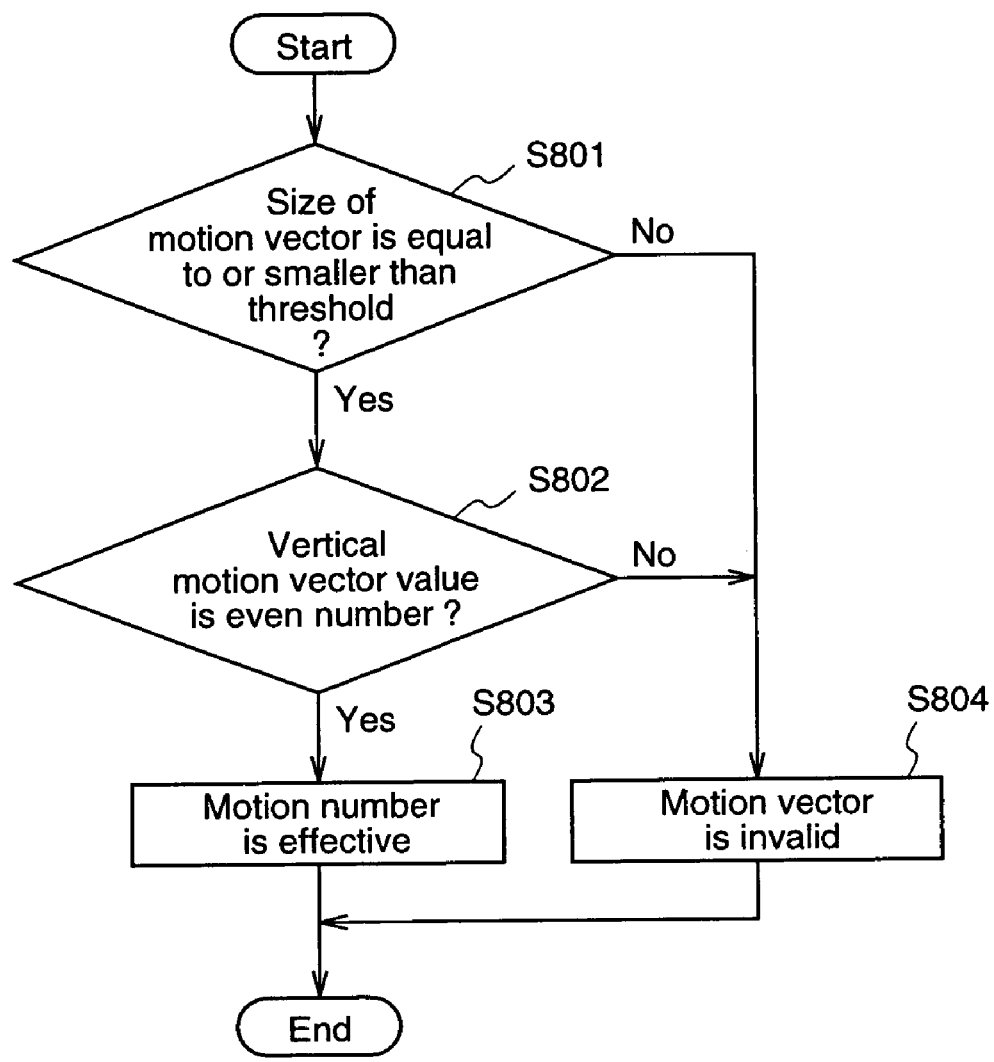
FIG. 8 is a flowchart for explaining a judgement method of a motion vector judgement unit 603 according to embodiments of the present invention.

The motion vector judgment unit 603 judges the effectiveness of the motion vector that is outputted by the motion vector converter 602. The flowchart for explaining the judgment procedure is shown in FIG. 8. Initially, in step S801, it is judged whether the size of the motion vector is equal to or smaller than a threshold. The judgment can be "Yes" when both of horizontal and vertical motion vectors are equal to or smaller than thresholds, or the judgment can be "Yes" when the sum of squares of the horizontal and vertical motion vectors is equal to or smaller than a threshold. When the judgment result in step S801 is "Yes", it is judged whether the vertical motion vector value is an even number (step S802). Here, as the unit of the motion in the vertical direction, the distance between lines in the frame structure is assumed to be one pixel. For example, the vertical size of the motion vector "B" in FIG. 7 is two pixels. The reason why a motion vector having an even vertical motion vector value is selected in step S802 is because when the vertical motion vector value is an odd number, an interpolation pixel cannot be taken directly from the reference field. When the judgment result in step S801 is "No", the motion vector is judged to be invalid in step S804 and is not used in the following processes. When the judgment result in step S802 is "Yes", the motion vector that satisfies the conditions in steps S801 and S802 is judged to be an effective motion vector in step S803 and is used in the following processes. Further, when the judgment result in step S802 is "No", the motion vector is judged to be invalid in step S804 and is not used in the following processes. Here, when the macroblock has plural motion vectors (forward and backward), the judgment can be made individually for both of the vectors, or the judgment can be made simultaneously. The result of the judgment by the motion vector judgment unit 603 and the motion vector are outputted to the inter-field interpolation pixel generator 604.

The inter-field interpolation pixel generator 604 obtains a pixel from a reference field based on the motion vector and its judgement result which are inputted from the motion vector judgement unit 603 so as to generate an inter-field interpolation pixel for the deinterlacing target field. The subsequent processes are performed in units of macroblock, or units which are smaller than the macroblock. In the following description, assume that the processes are performed in units, where each unit is composed of 8 pixels (horizontal)×4 pixels (vertical) (hereinafter, referred to as a block). Further, as used herein, the term "a motion vector" indicates a motion vector which has been already converted by the motion vector converter 602.

Figure 9:
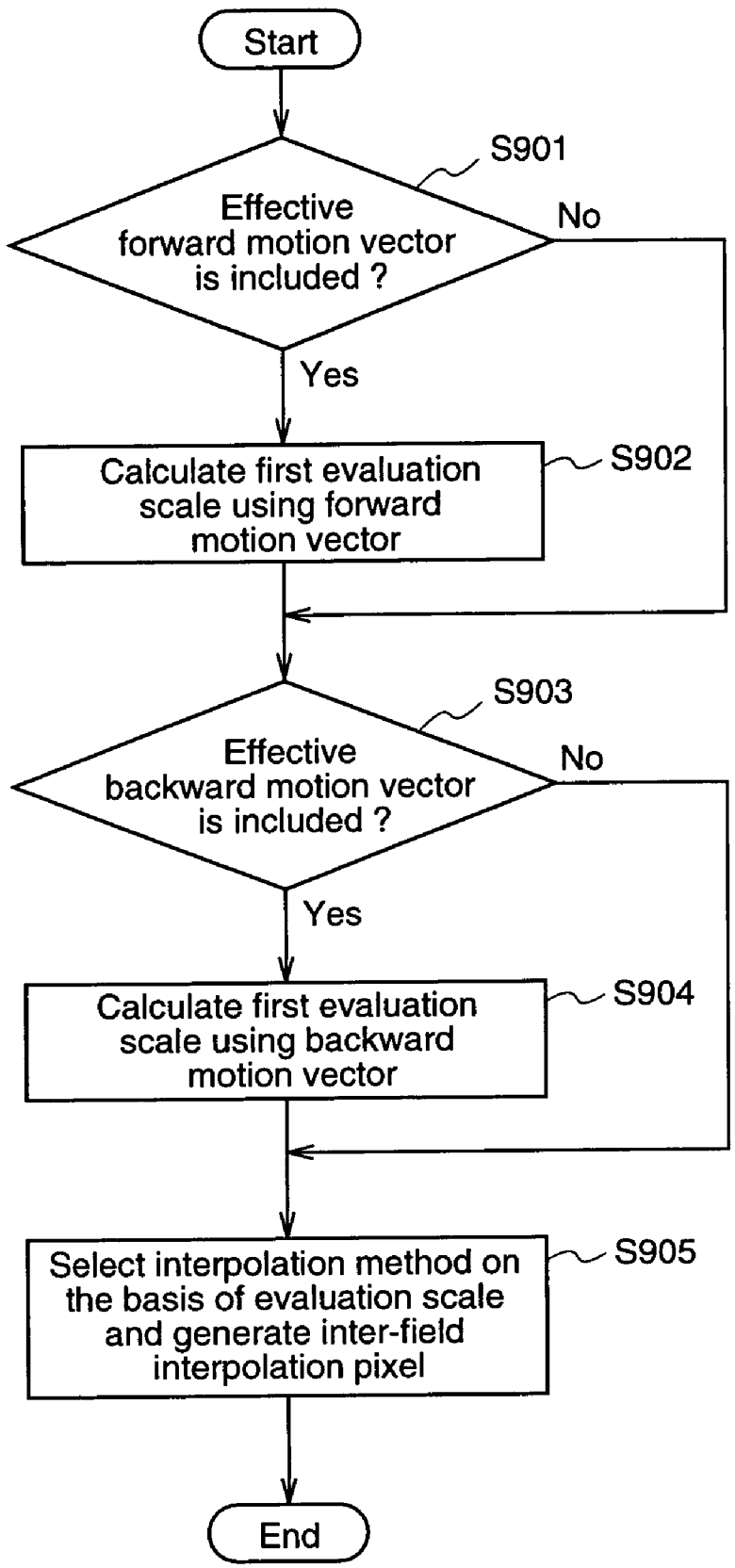
FIG. 9 is a flowchart for explaining an example of an operation of an inter-field interpolation pixel generator 604 according to embodiments of the present invention.
Figure 10:
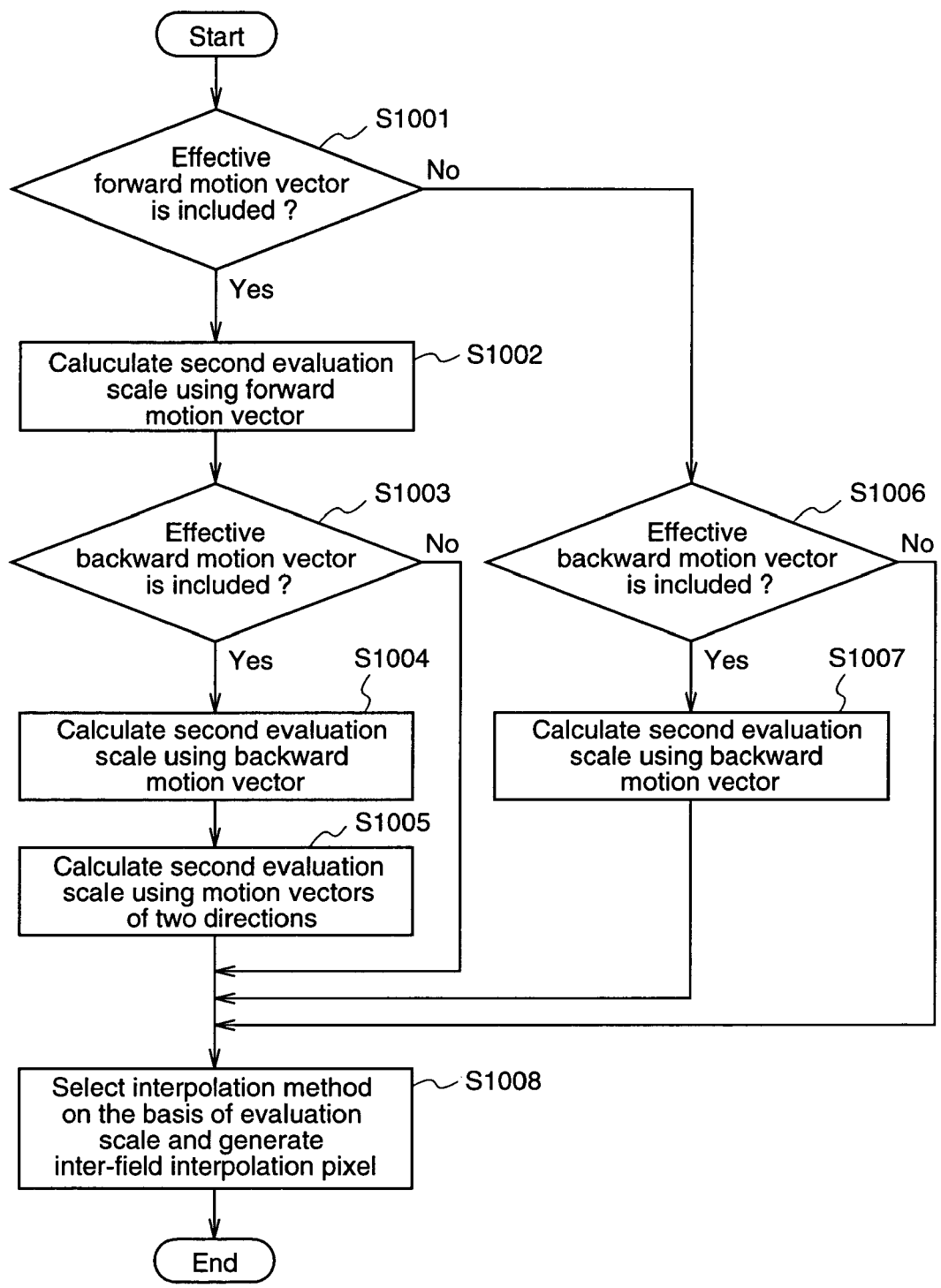
FIG. 10 is a flowchart for explaining an example of an operation of an inter-field interpolation pixel generator 604 according to embodiments of the present invention.

Examples of the operation of the inter-field interpolation pixel generator 604 are shown in FIGS. 9 and 10. When there are plural effective motion vectors, the inter-field interpolation pixel generator 604 initially calculates an evaluation scale for selecting one of the motion vectors, which is to be used for generating an inter-field interpolation pixel. In this third embodiment, two calculation methods for obtaining the evaluation scale will be described. FIG. 9 is a flowchart for explaining an example of the operation of the inter-field interpolation pixel generator 604 when one of the motion vectors is selected on a first evaluation scale. FIG. 10 is a flowchart for explaining an example of the operation of the inter-field interpolation pixel generator 604 when one of the motion vectors is selected on a second evaluation scale.

Hereinafter, the case where the motion vector is selected on the first evaluation scale will be described with reference to FIG. 9.

Initially, in step S901, it is judged whether or not the deinterlacing target block includes an effective forward motion vector. Here, the case where an effective forward motion vector is included is a case where a macroblock including the deinterlacing target block has a forward motion vector and the motion vector judgment unit 603 judges the forward motion vector to be effective. When the judgment result in step S901 is "Yes", the operation proceeds to step S902. When the judgment result in step S901 is "No", the operation proceeds to step S903. In step S902, the evaluation scale is calculated by using the forward motion vector.

Hereinafter, the first evaluation scale calculation method using the forward motion vector will be described with reference to FIG. 13.

Figure 13:
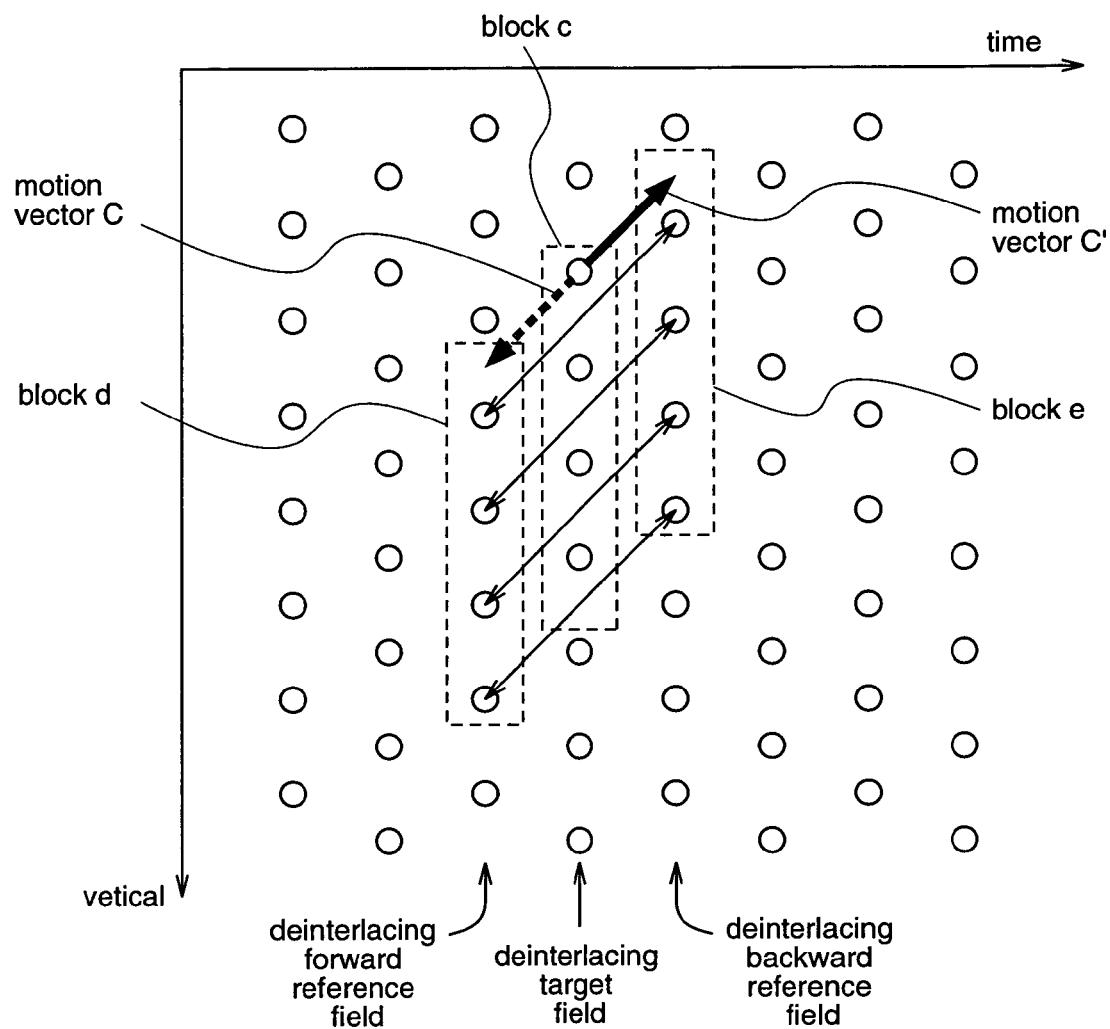
FIG. 13 is a diagram schematically showing a state of an interlaced image.

FIG. 13 is a diagram schematically showing a state of a decoded image (interlaced image) as in FIG. 7. Assume here that an inter-field interpolation pixel is generated for a block "c" in the deinterlacing target field, and that the forward motion vector of a macroblock including the block "c" is a motion vector "C". In this case, the sum of the absolute values of the differences between a block "d" in a forward reference field that is indicated by the motion vector "C" and a block "e" in a backward reference field that is indicated by a motion vector "C'", which is in the opposite direction to the motion vector "C", is calculated. Here, the opposite motion vector "C'" is a motion vector which is in the opposite direction to the motion vector "C", and the motion vector "C'" indicates a reference field having an opposite positional (forward or backward) relationship to the reference field that is indicated by the motion vector "C", with respect to the deinterlacing target field. Further, the calculation of the sum of the absolute values of the differences between blocks means that differences between corresponding pixels which are coupled by arrows in the blocks "d" and "e" are obtained, and then, the sum of the absolute values of these differences is obtained in block unit. Then, the obtained sum of the absolute values of the differences is used as the first evaluation scale. In FIG. 13, only vertical pixels are shown, while horizontal pixels are also targets for the calculation of the sum of the absolute values of the differences between pixels as the first evaluation scale.

In step S903, it is judged whether or not the block "c" includes an effective backward motion vector. When the judgment result in step S903 is "Yes", the operation proceeds to step S904. On the other hand, when the judgment result is "No", the operation proceeds to step S905.

In step S904, the evaluation scale is calculated by using the backward motion vector. Since this evaluation scale calculation method is the same as that in step S902, its description is not given here. The evaluation scale calculation is different in that the backward motion vector is used.

Finally, in step S905, based on the evaluation scales which are obtained in the above-mentioned processes, the interpolation method is selected, i.e., a motion vector to be used for generating the inter-field interpolation pixel is selected, and then the inter-field interpolation pixel is generated. The selection method will be described later.

Next, the case where the motion vector is selected on the second evaluation scale will be described with reference to FIG. 10.

Initially, in step S1001, it is judged whether or not a deinterlacing target block includes an effective forward motion vector. When the judgment result in step S1001 is "Yes", the operation proceeds to step S1002. On the other hand, when the judgment result is "No", the operation proceeds to step S1006. In step S1002, the evaluation scale is calculated by using the forward motion vector.

Figure 14:
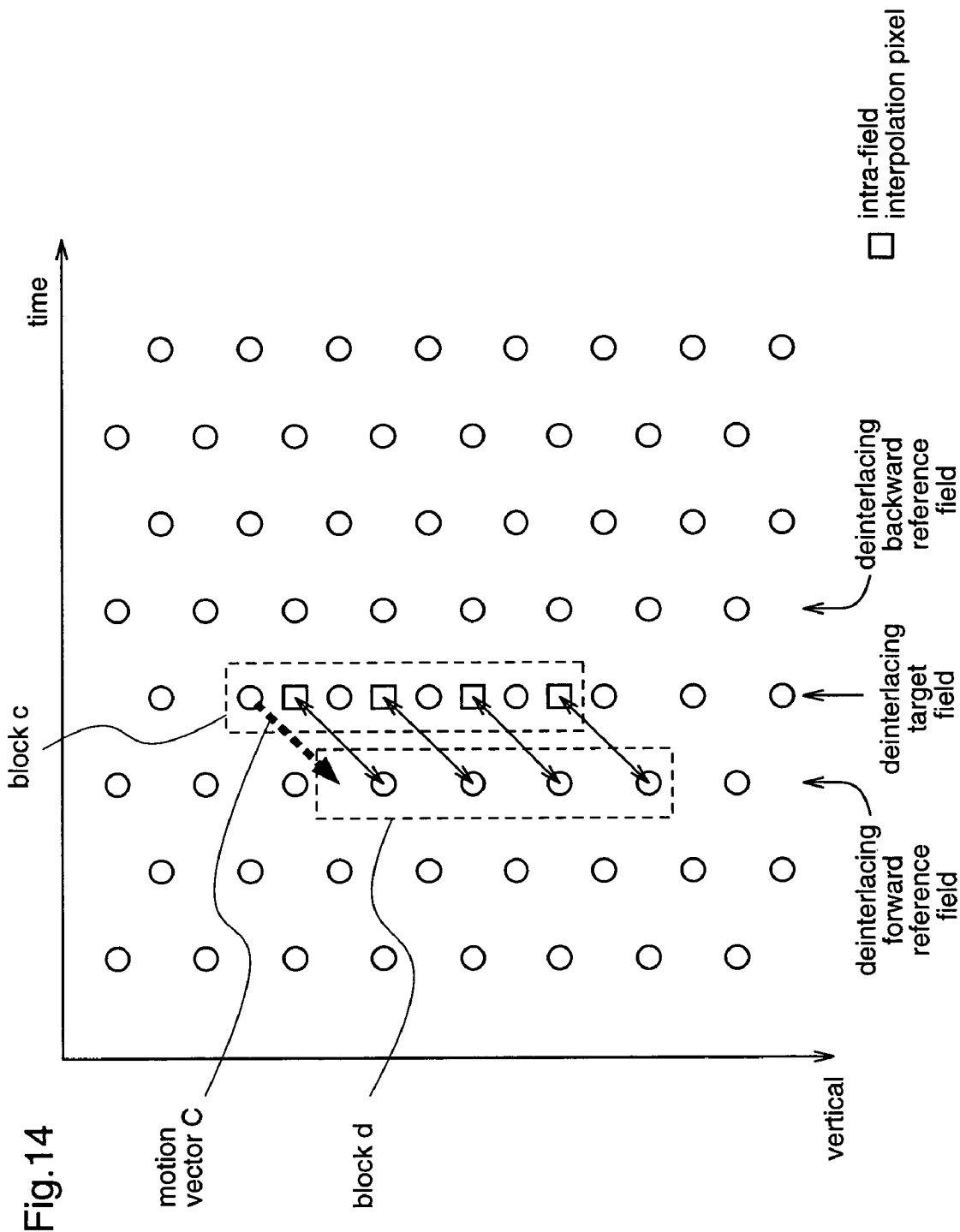
FIG. 14 is a diagram schematically showing a state of an interlaced image.

Hereinafter, the second evaluation scale calculation method will be described with reference to FIG. 14. FIG. 14 is a diagram schematically showing a state of a decoded image (interlaced image) as in FIG. 7. Assume here that an inter-field interpolation pixel is generated for a block "c" and that a macroblock including the block "c" in the deinterlacing target field has only a forward motion vector "C" as an effective motion vector. In this case, the sum of the absolute values of the differences between pixels in the block "d" in a forward reference field indicated by the motion vector "C" and interpolation pixels in the block "c", as generated by the intra-field interpolation pixel generator 605 (the generation method will be described later), is calculated. Here, the calculation of the sum of the absolute values of the differences between blocks means that differences between corresponding pixels which are coupled by arrows in the blocks "d" and "c" are obtained, and then, the sum of the absolute values of these differences is obtained in block unit. Then, the sum of the absolute values of these differences is used as the second evaluation scale. In FIG. 14, only vertical pixels are shown, while horizontal pixels are also targets for the calculation of the sum of the absolute values of the differences between pixels as the second evaluation scale.

Figure 15:
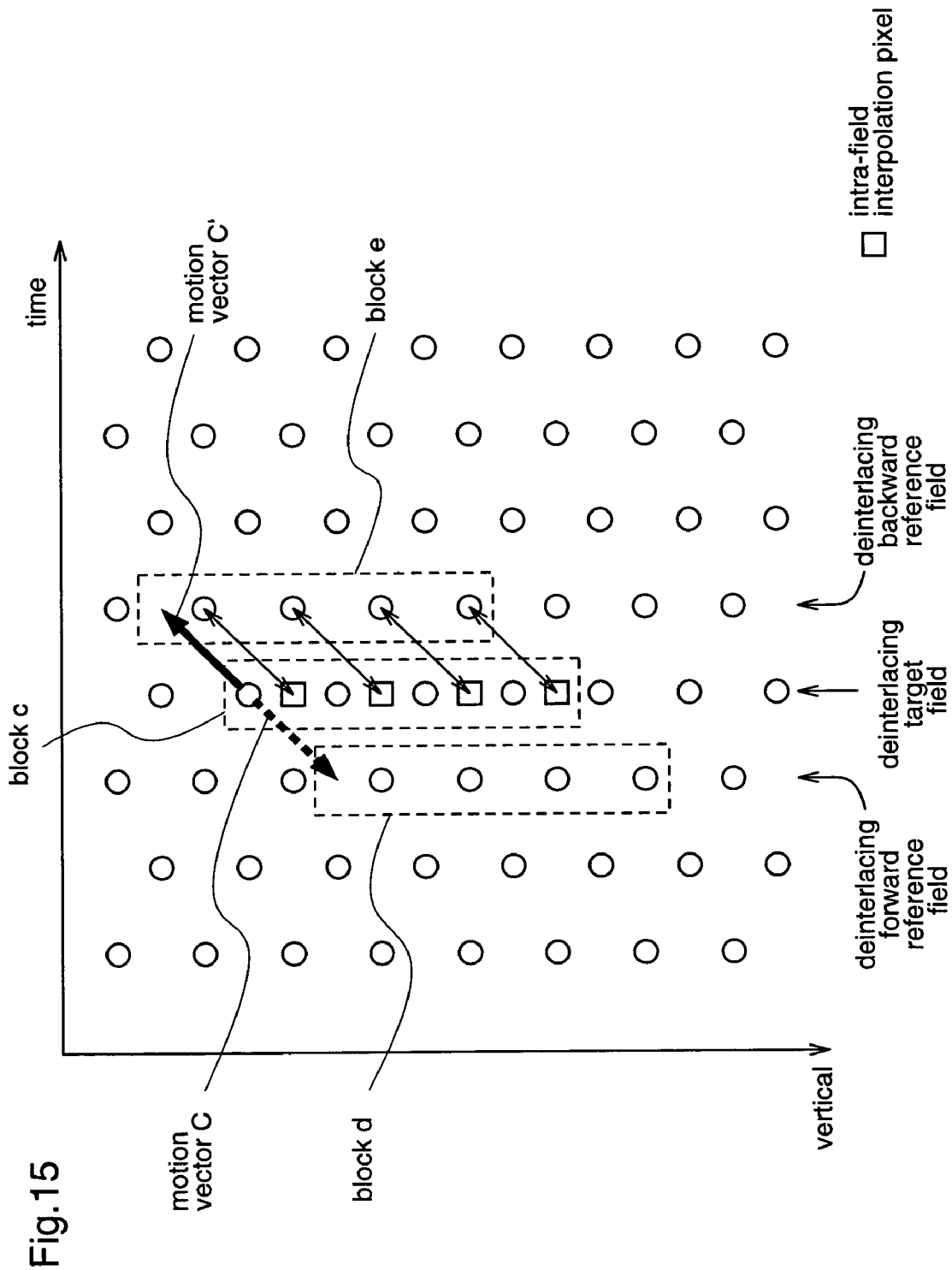
FIG. 15 is a diagram schematically showing a state of an interlaced image.

Another method for calculating the second evaluation scale will be described with reference to FIG. 15. Assume here that an inter-field interpolation pixel is generated for a block "c" and that a macroblock including the block "c" has only a forward motion vector "C" as an effective motion vector. In this case, the sum of the absolute values of the differences between pixels in a block "e" in a backward reference field that is indicated by a motion vector "C'", which is in the opposite direction to the motion vector "C" and intra-field interpolation pixels in the block "c", as generated by the intra-field interpolation pixel generator 605 (which will be described later), is calculated. Here, the calculation of the sum of the absolute values of the differences between blocks means that differences between corresponding pixels which are coupled by arrows in the blocks "c" and "e" are obtained, and then, the sum of the absolute values of these differences is obtained in block unit. Then, the sum of the absolute values of the differences is used as the second evaluation scale. In FIG. 15, only vertical pixels are shown, while horizontal pixels are also targets for the calculation of the sum of the absolute values of differences between the pixels as the second evaluation scale.

Further, as another method for calculating the second evaluation scale, there can be considered a method by which in FIG. 15 the sum of the absolute values of the differences between pixels which are generated from mean values of positionally corresponding pixels in the blocks "d" and "e" and intra-field interpolation pixels in the block "c", as generated by the intra-field interpolation pixel generator 605 (which will be described later), is obtained, and the sum of the absolute values of the differences is used as the second evaluation scale.

Subsequently, in step S1003, after the evaluation scale of the effective forward motion vector is calculated, it is further judged whether or not the deinterlacing target block includes an effective backward motion vector. When the judgment result in step S1003 is "Yes", the operation proceeds to step S1004. When the judgment result in step S1003 is "No", the operation proceeds to step S1008.

In step S1004, the evaluation scale is calculated by using the backward motion vector. Since the evaluation scale calculation method is the same as that in step S1002, its description is not given here. The evaluation scale calculation method in step S1004 is different in that the backward motion vector is used.

Figure 16:
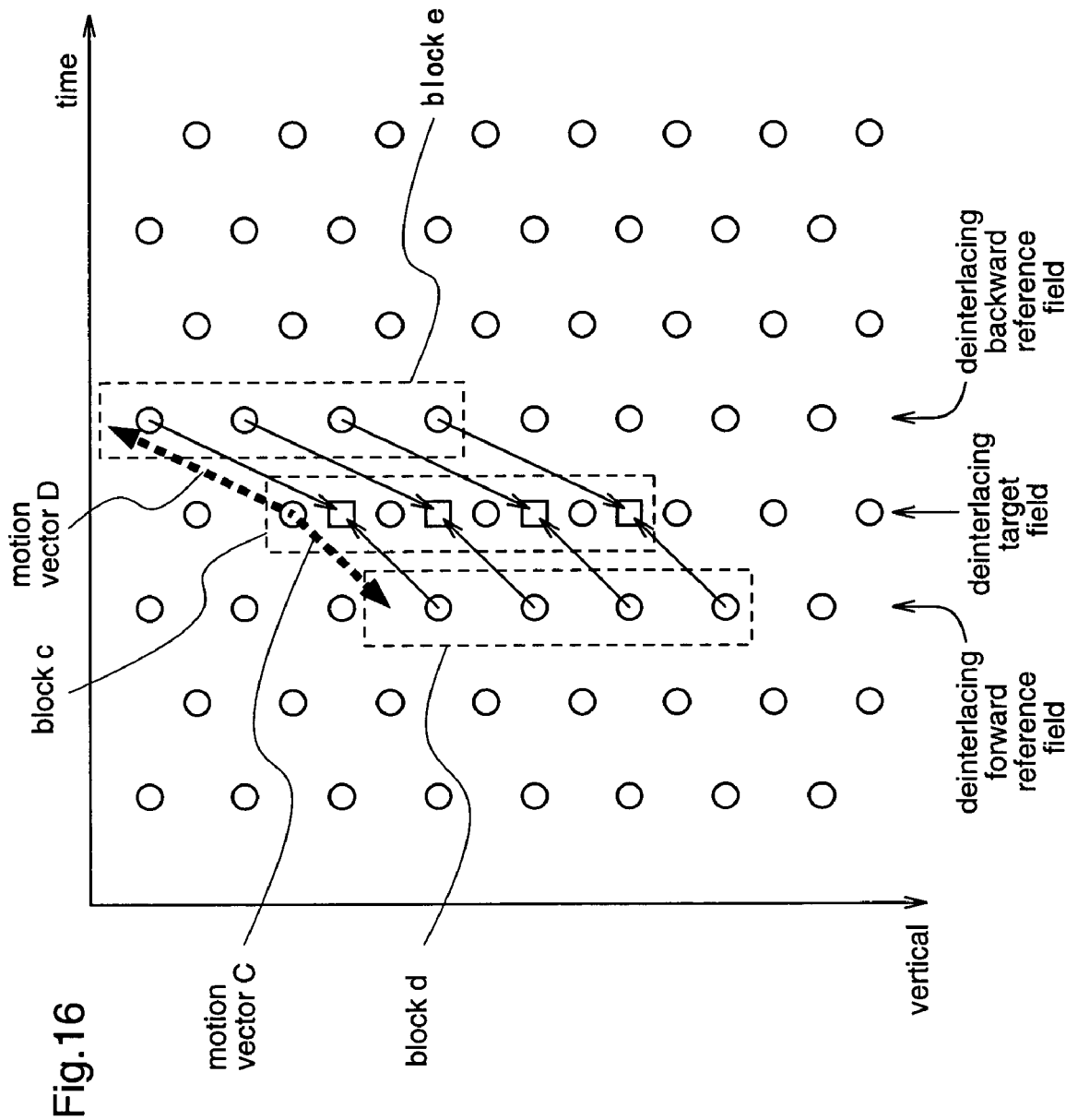
FIG. 16 is a diagram schematically showing a state of an interlaced image.

In step S1005, the evaluation scale is calculated by using motion vectors of two directions. This evaluation scale calculation method will be described with reference to FIG. 16. Assume here that an inter-field interpolation pixel is generated for a block "c" and that a macroblock including the block "c" has a forward motion vector "C" and a backward motion vector "D" as the motion vectors. In this case, initially, mean values of pixels in a block "d" in a forward reference field that is indicated by the motion vector "C" and pixels in a block "e" in a backward reference field that is indicated by the motion vector "D" are respectively calculated, and thereafter, the sum of the absolute values of the differences between the mean values and interpolation pixels in the block "c", as generated by the intra-field interpolation pixel generator 605 (which will be described later), is calculated. Here, the calculation of the sum of the absolute values of the differences between blocks means that differences between the mean values of corresponding pixels which are connected by arrows in the blocks "d" and "e" and the intra-field interpolation pixels which are connected by the arrows in the block "c" are obtained, and then, the sum of the absolute values of these differences is obtained in block unit. Then, the sum of the absolute values of the differences is used as the second evaluation scale. In FIG. 16, only vertical pixels are shown, while horizontal pixels are also targets for the calculation of the sum of absolute values of differences between pixels as the second evaluation scale.

When these is no effective forward motion vector, it is judged whether or not the deinterlacing target block includes an effective backward motion vector (step S1006). When the judgment result in step S1006 is "Yes", the operation proceeds to step S1007. When the judgment result in step S1006 is "No", the operation proceeds to step S1008.

In step S1007, the evaluation scale is calculated by using the backward motion vector. Since the evaluation scale calculation method is the same as that in step S1004, a description thereof is not given here.

Finally in step S1008, based on the evaluation scales which are obtained in the above-mentioned processes, the interpolation method is selected, i.e., a motion vector which is to be used and a reference field from which the inter-field interpolation pixel is to be obtained are selected, and then the inter-field interpolation pixel is generated. The selection method will be described later.

The operation for generating the inter-field interpolation pixel based on the obtained evaluation scales will be hereinafter described.

Figure 17:
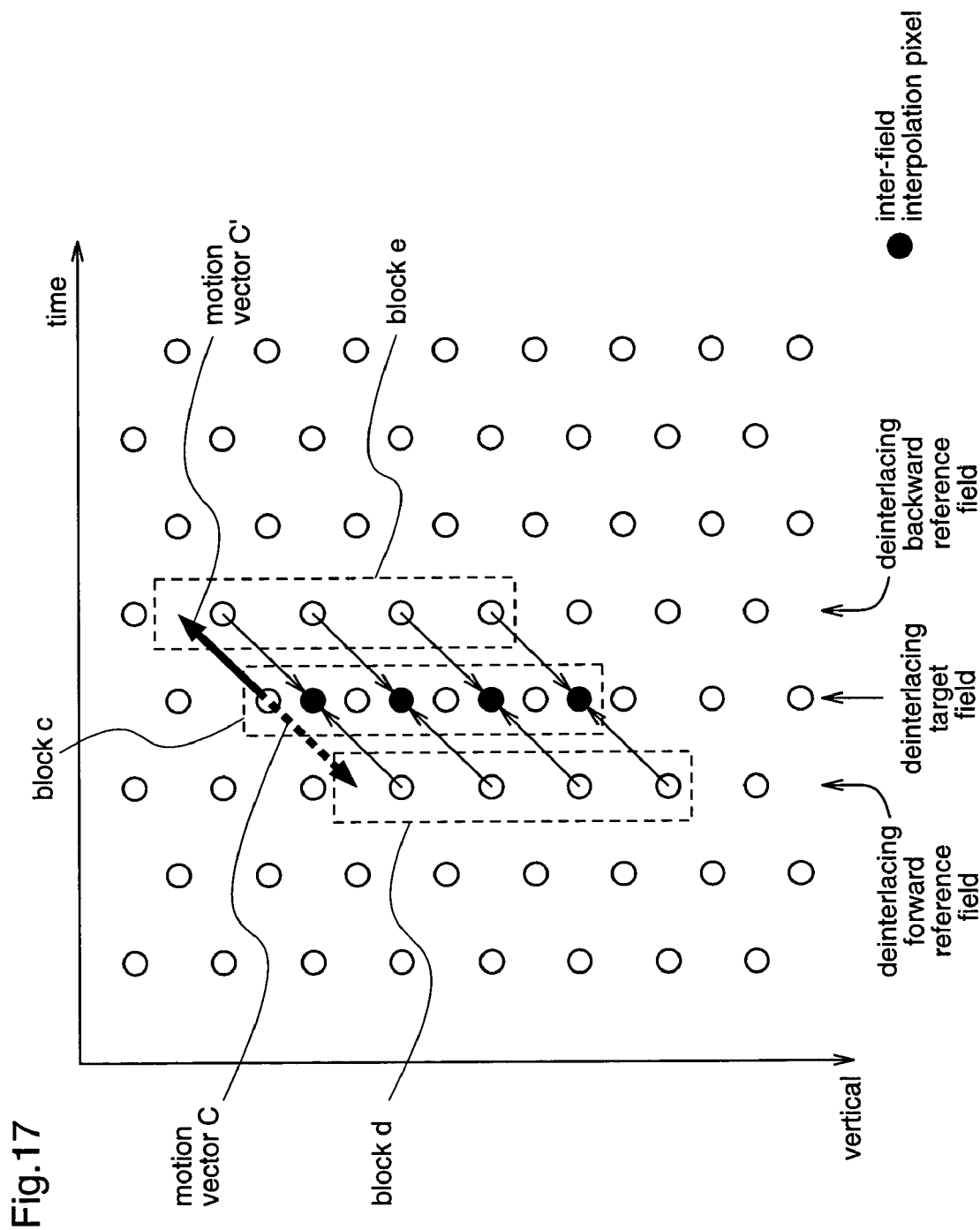
FIG. 17 is a diagram schematically showing a state of an interlaced image.

Initially, the processing method in step S905, in the case where the first evaluation scale is used, will be described. In this processing method, when there are forward and backward motion vectors as effective motion vectors, a motion vector from which the minimum first evaluation scale is obtained is selected. Then, an inter-field interpolation pixel is generated by using the motion vector from which the minimum evaluation scale is obtained. As an example, an inter-field interpolation pixel generation method in a case where the evaluation scale of the forward motion vector is the minimum will be described with reference to FIG. 17. In this case, mean values of a block "d", which is referred to by a forward motion vector "C" from a forward reference field, and a block "e", which is referred to by a motion vector "C'" that is in the opposite direction to the forward motion vector "C" from a backward reference field, are generated as the inter-field interpolation pixels. Here, the calculation of the mean values between the blocks indicates that mean values of pixels which are connected by arrows in the blocks "d" and "e" in FIG. 17 are obtained. In FIG. 17, only vertical pixels are shown, while as for horizontal pixels, the contents of the processing are also the same. Further, in this case, the pixels in the block "d" or the pixels in the block "e" may be used as they are, as the inter-field interpolation pixels.

Next, the processing method in step S1008, in the case where the second evaluation scale is used, will be described. According to this processing method, when there is a forward motion vector, a backward motion vector, or motion vectors in the two directions as the effective motion vector, a motion vector and an interpolation direction with which the minimum of the second evaluation scales obtained for one direction, the opposite direction, or two directions with respect to each motion vector is obtained are selected. Then, the inter-field interpolation pixels are generated based on the selected motion vector and interpolation direction. Here, the selection of the interpolation direction means that a reference field in a direction that is indicated by the motion vector, from which field the interpolation pixels are to be obtained, is selected. Here, one of directions (one direction, the opposite direction, and two directions) in which the evaluation scale is obtained by using the corresponding motion vector is selected as the interpolation direction. As an example, an inter-field interpolation pixel generation method in a case where an evaluation scale which is obtained for two directions by using a forward motion vector is the minimum will be described with reference to FIG. 17. FIG. 17 shows the case where the evaluation scale that is obtained for two directions with using the forward motion vector "C" is the minimum. In this case, the mean values of the block "d", which is referred to by the forward motion vector "C", and the block "e", which is referred to by the motion vector "C'" that is in the opposite direction to the forward motion vector "C" from a backward reference field, are generated as the inter-field interpolation pixels. Here, the calculation of the mean values between blocks means that mean values of corresponding pixels which are coupled by arrows in the blocks "d" and "e" are obtained. When the evaluation scale that is obtained by using the forward motion vector "C" with respect to one direction is the minimum, the inter-field interpolation pixels are generated from pixels in the block "d", and when the evaluation scale that is obtained by using the forward motion vector "C" with respect to the opposite direction is the minimum, the inter-field interpolation pixels are generated from pixels in the block "e". In FIG. 17, only vertical pixels are shown, while as for horizontal pixels, the same processing is also performed.

The inter-field interpolation pixels may be generated by using both of the first and second evaluation scales. In this case, for example, a method by which the motion vector is selected on the first evaluation scale and the interpolation direction is decided on the second evaluation scale can be employed.

Figure 11:
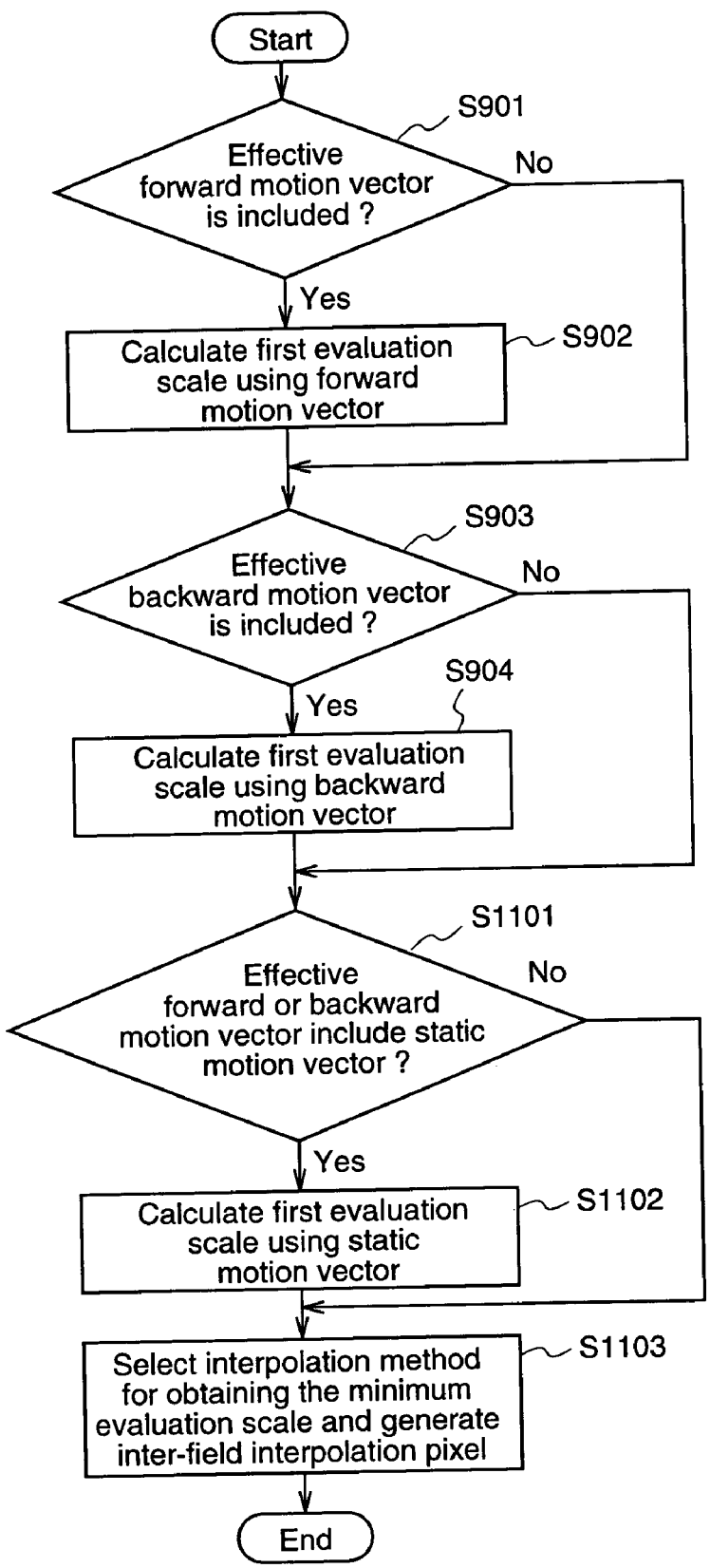
FIG. 11 is a flowchart for explaining an example of an operation of an inter-field interpolation pixel generator 604 according to embodiments of the present invention.
Figure 12:
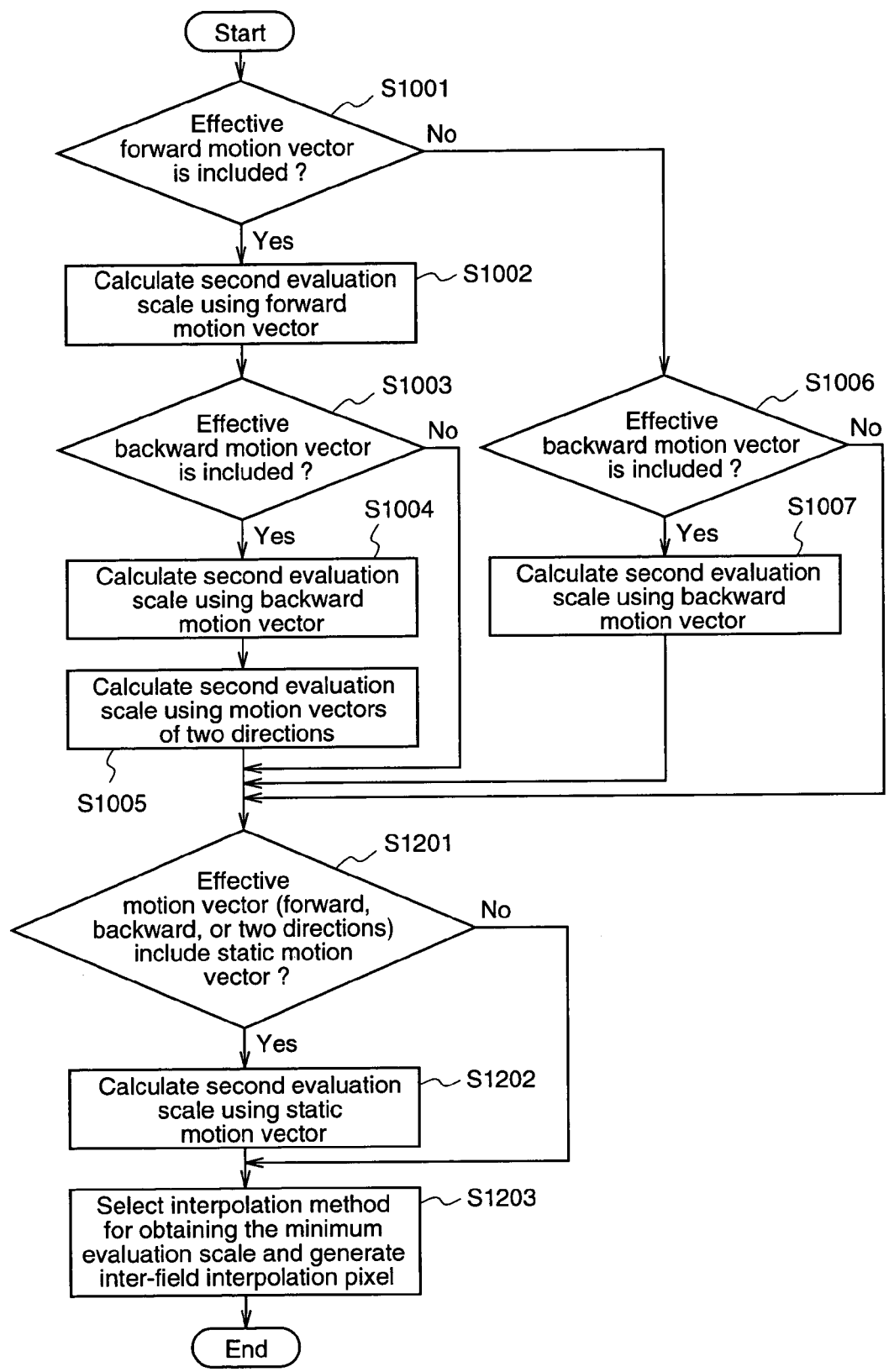
FIG. 12 is a flowchart for explaining an example of an operation of an inter-field interpolation pixel generator 604 according to embodiments of the present invention.

Examples of the operation of the inter-field interpolation pixel generator 604 will now be described in a case where the evaluation scale for selecting the optimum motion vector for the generation of inter-field interpolation pixels is calculated by using a motion vector that is converted by the motion vector converter 602 and a motion vector having no motion (static motion vector), and the inter-field interpolation pixels are generated by using the motion vector with which the best evaluation scale is obtained. FIG. 11 is a flowchart for explaining an example of the operation of the inter-field interpolation pixel generator 604 when the motion vector is selected on the first evaluation scale. FIG. 12 is a flowchart for explaining an example of the operation of the inter-field interpolation pixel generator 604 when the motion vector is selected on the second evaluation scale.

Initially, an example of the operation of the inter-field interpolation pixel generator 604 is described with reference to FIG. 11.

In FIG. 11, since the operations in steps S901 to S904 are the same as those in FIG. 9, the descriptions thereof are not given here. In step S1101, it is judged whether or not an effective motion vectors (forward or backward) includes a static motion vector. When the judgment result in step S1101 is "Yes", the operation proceeds to step S1102. When the judgment result in step S1101 is "No", the operation proceeds to step S1103.

Figure 18:
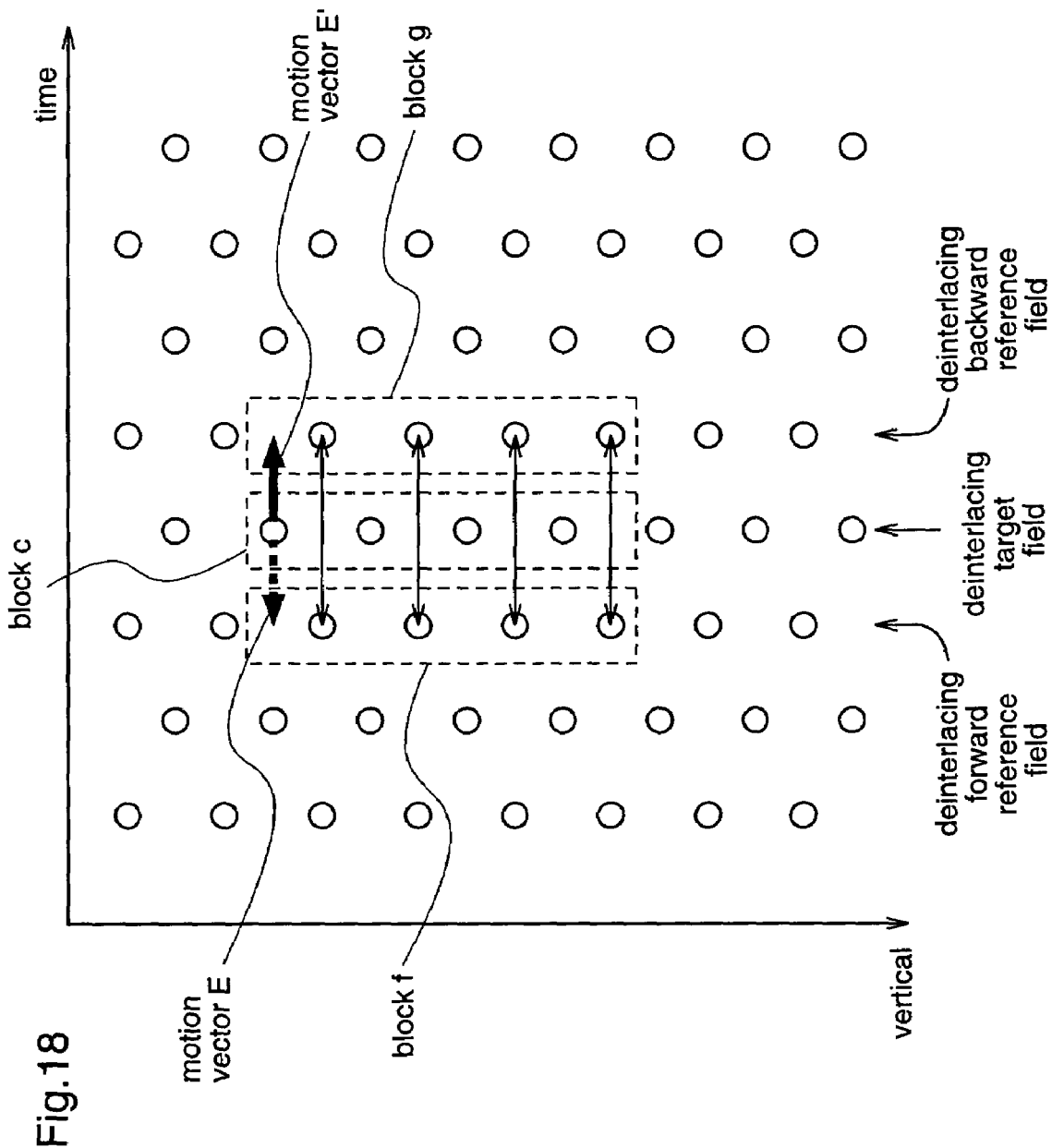
FIG. 18 is a diagram schematically showing a state of an interlaced image.

In step S1102, the first evaluation scale is calculated by using the static motion vector. The calculation method is described with reference to FIG. 18. FIG. 18 is a diagram schematically showing a state of a decoded image (interlaced image) as in FIG. 7. Assume here that inter-field interpolation pixels are generated for a block "c". In this case, the sum of the absolute values of the differences between a block "f" in a forward reference field that is indicated by a static motion vector "E" and a block "g" in a backward reference field that is indicated by a motion vector "E'" which is in the opposite direction to the static motion vector "E" is calculated. Here, the opposite motion vector "E'" is a motion vector having the opposite direction to the motion vector "E" and indicating a reference field which has the opposite positional (forward or backward) relationship to the reference field that is indicated by the motion vector "E" with respect to the target field. The calculation of the sum of the absolute values of the differences between blocks means that differences between corresponding pixels which are coupled by arrows in the blocks "f" and "g" are obtained, and then the sum of the absolute values of these differences is obtained in block unit. Then, the obtained sum of the absolute values of the differences is used as the evaluation scale. In FIG. 18, only the vertical pixels are shown, while horizontal pixels are also targets for the calculation of the sum of the absolute values of the differences between pixels as the first evaluation scale.

Finally, in step S1103, an interpolation method for obtaining the minimum evaluation scale among the first evaluation scales which are obtained by using the motion vector and the static motion vector in the above-mentioned processes is selected, and then the inter-field interpolation pixels are generated.

An example of the operation of the inter-field interpolation pixel generator 604 will now be described with reference to FIG. 12.

In FIG. 12, since the operations in step S1001 to S1007 are the same as those in FIG. 10, the descriptions thereof are not given here. In step S1201, it is judged whether or not an effective motion vector (forward, backward, or two directions) includes a static motion vector. When the judgment result in step S1201 is "No", the operation proceeds to step S1203. When the judgment result in step S1201 is "Yes", the operation proceeds to step S1202.

When in step S1202 the second evaluation scale is obtained by using the static motion vector, the evaluation scale can be obtained similarly to the methods which have been described with reference to FIGS. 14, 15 and 16.

Finally, in step S1203, an interpolation method for obtaining the minimum evaluation scale among the second evaluation scales that are obtained by using the motion vector and the static motion vector in the above-mentioned processes is selected, and then the inter-field interpolation pixels are generated.

The inter-field interpolation pixels that are generated as described above are outputted to the weighting factor decision unit 606 and the progressive image generator 607.

Next, the operation of the intra-field interpolation pixel generator 605 will be described. The intra-field interpolation pixel generator 605 generates intra-field interpolation pixels by using pixels in the deinterlacing target field.

Figure 19:
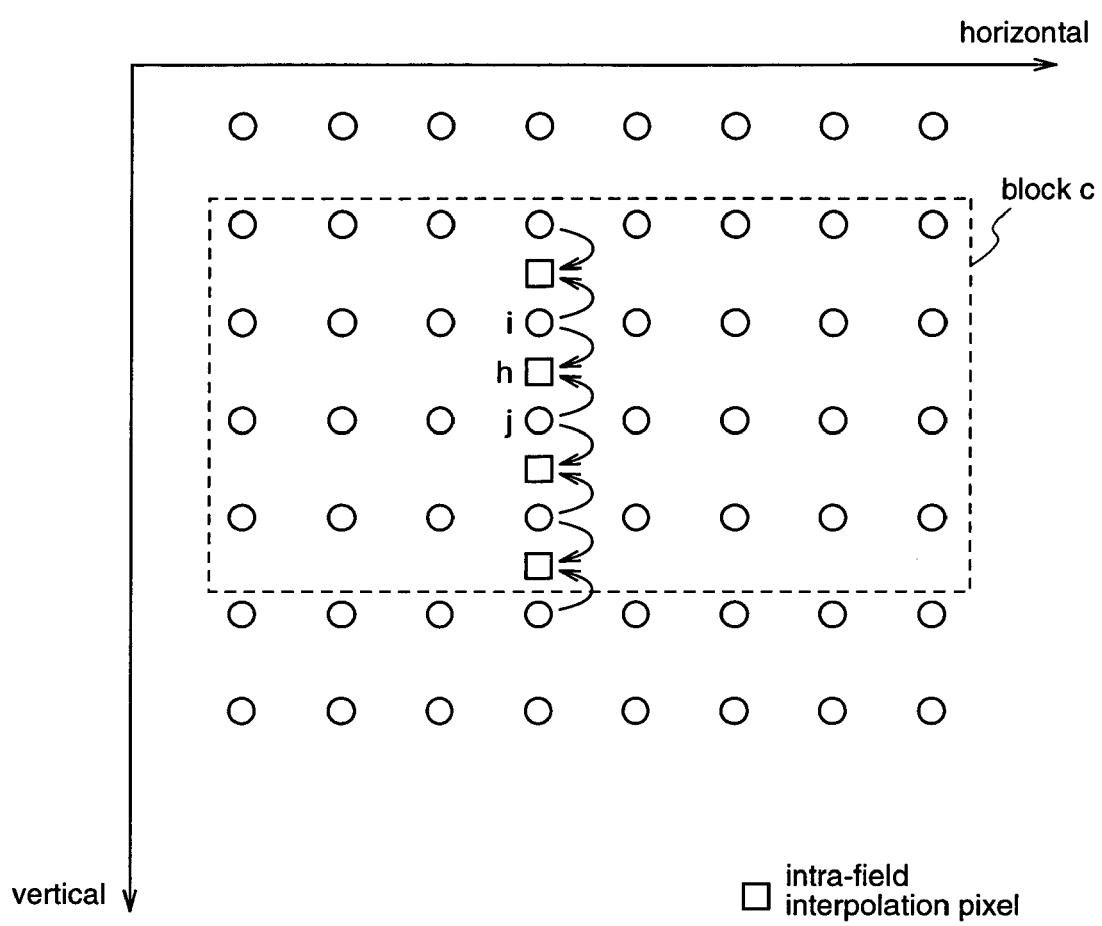
FIG. 19 is a diagram schematically showing a state of a deinterlacing target field pixel.

A first example of the operation of the intra-field interpolation pixel generator 605 will be described with reference to FIG. 19. FIG. 19 is a diagram schematically showing a state of pixels in a deinterlacing target field of a decoded image (interlaced image). When the intra-field interpolation pixels are to be generated for a block "c" in FIG. 19, the intra-field interpolation pixels are generated from the mean values of upper and lower pixels. For example, an interpolation pixel "h" is generated as the mean value of pixels "i" and "j".

Figure 20:
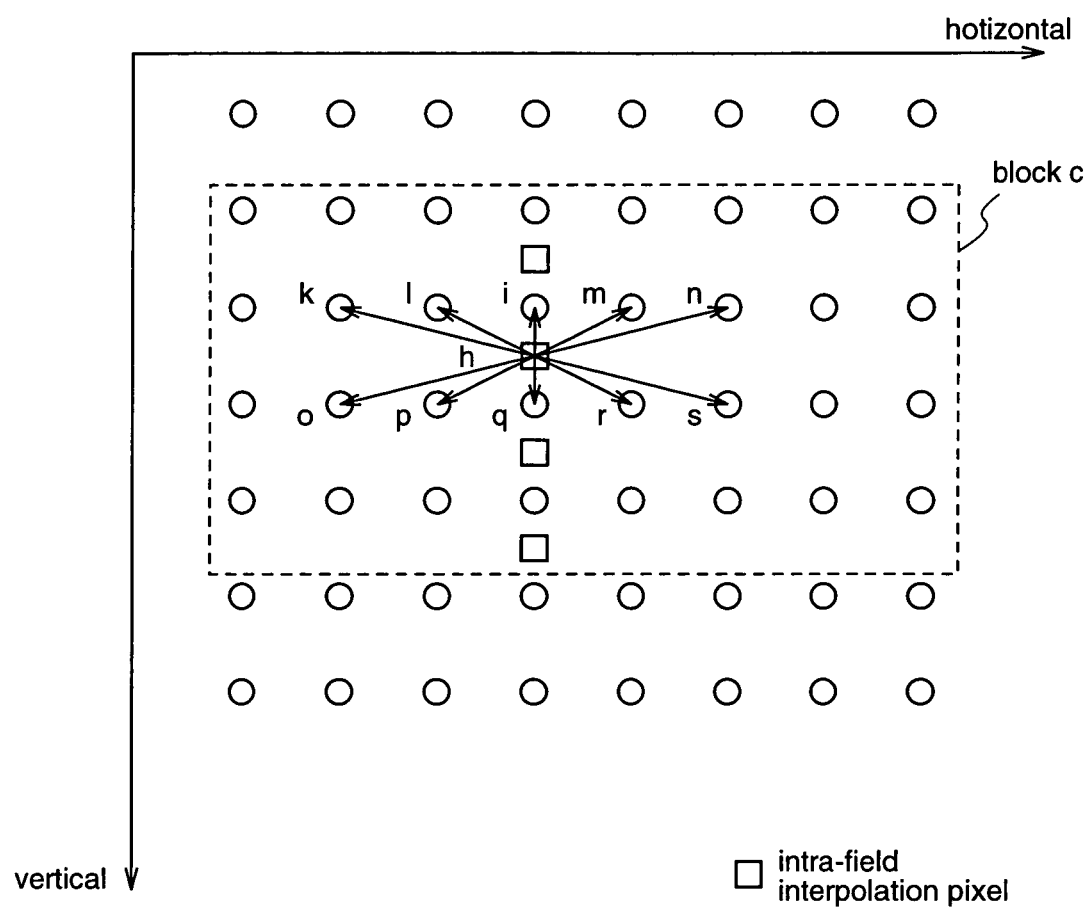
FIG. 20 is a diagram schematically showing a state of a deinterlacing target field pixel.
Figure 21:
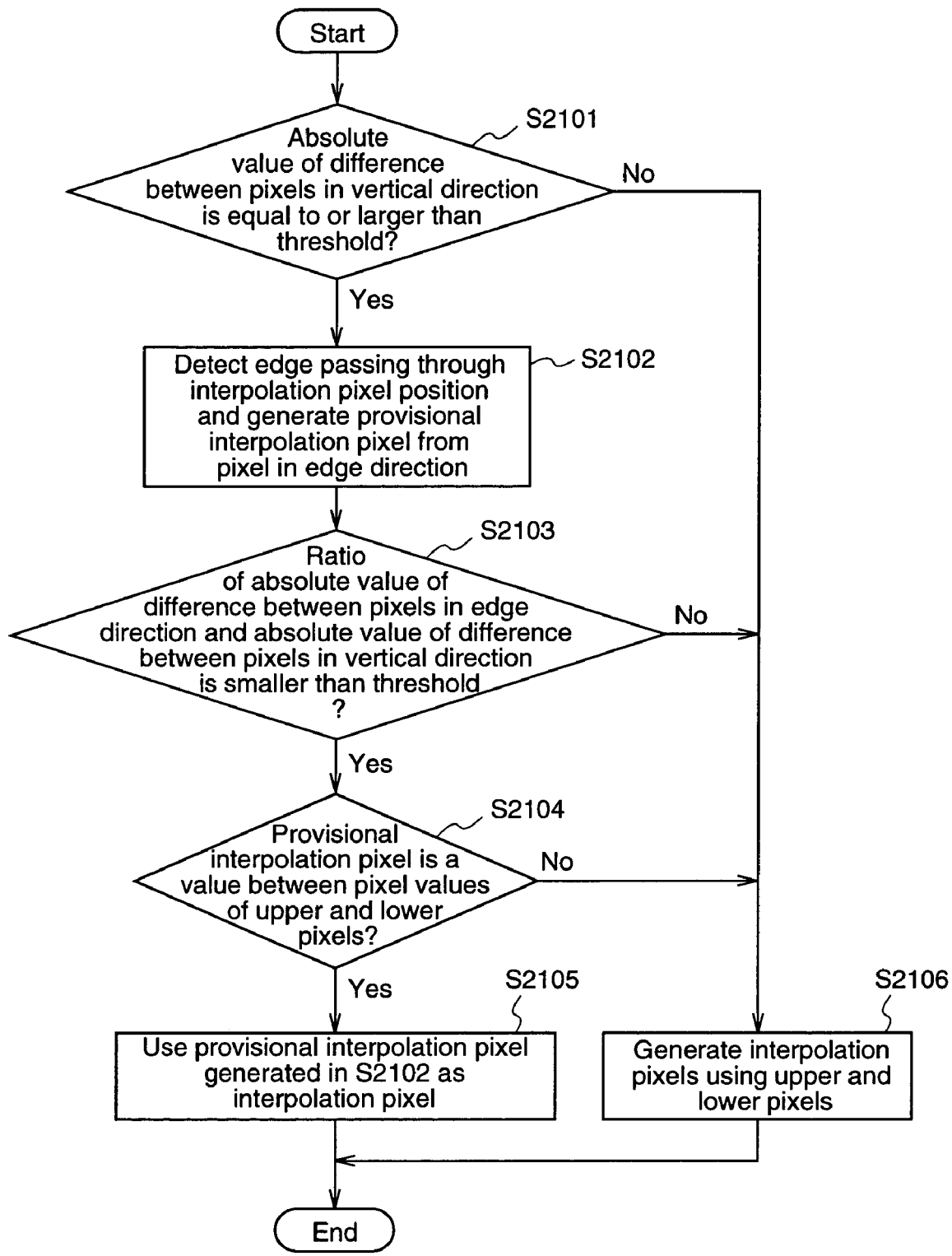
FIG. 21 is a flowchart for explaining an example of an operation of an intra-field interpolation pixel generator 605 according to embodiments of the present invention.

A second example of the operation of the intra-field interpolation pixel generator 605 will be described with reference to FIGS. 20 and 21. FIG. 20 is a diagram illustrating pixels in a deinterlacing target field, showing a case where an interpolation pixel "h" is generated. FIG. 21 is a flowchart for explaining the operation of the intra-field interpolation pixel generator 605.

Initially, in step S2101, it is judged whether or not the absolute value of a difference between pixels in the vertical direction (pixels "i" and "q") is equal to or larger than a threshold. When the judgment result in step S2101 is "Yes", the operation proceeds to step S2102. When the judgment result in step S2101 is "No", the operation proceeds to step S2106.

In step S2102, the direction of an edge passing through the pixel "h" is detected by using pixels surrounding the position of the interpolation pixel (pixel "h"). This can be achieved by selecting a direction in which the absolute value of a difference between two pixels in the direction of the edge passing through the pixel "h" is the minimum value. More specifically, the absolute values of the differences between two pixels in five directions that are shown by arrows in FIG. 20 are calculated. Assume here that the absolute value of the difference between pixels "n" and "o" is the minimum among the absolute values of the differences in the five directions. In this case, a provisional interpolation pixel is generated from the mean value of the pixels "n" and "o".

Next, in the processes in steps S2103 and S2104, the strongness of the correlation between pixels which exist in the direction of the edge is obtained as the reliability of the edge.

In step S2103, it is judged whether or not the ratio of the absolute value of a difference of pixels in the direction of edge (pixels "n" and "o") to the absolute value of a difference of pixels in the vertical direction (pixels "i" and "q") is smaller than a threshold. When the judgment result in step S2103 is "Yes", the operation proceeds to step S2104. When the judgment result in step S2103 is "No", the operation proceeds to step S2106.

In step S2104, it is judged whether the value of the provisional interpolation pixel which is generated in step S2102 is a value between the values of pixels in the vertical direction (upper and lower pixels, i.e., pixels "i" and "q").

When the judgment result in step S2104 is "Yes", the operation proceeds to step S2105. When the judgment result in step S2104 is "No", the operation proceeds to step S2106. As described above, in step S2105, the provisional interpolation pixel which is generated in step S2102 is adopted as the interpolation pixel "h". On the other hand, in step S2106, the interpolation pixel "h" is generated by using the upper and lower pixels in the vertical direction (pixels "i" and "q").

As described above, the intra-field interpolation generator 605 performs the above-mentioned operation for all interpolation positions in the block, and generates the intra-field interpolation pixels. Then, the generated intra-field interpolation pixels are outputted to the inter-field interpolation pixel generator 604, the weighting factor decision unit 606 and the progressive image generator 607.

The operation of the weighting factor decision unit 606 will now be described. The weighting factor decision unit 606 decides a weighting factor that is to be used when a weighted sum of the inter-field interpolation pixel and the intra-field interpolation pixel is obtained by the progressive image generator 607. Here, the decision of the weighting factor is made in block units.

Figure 22:
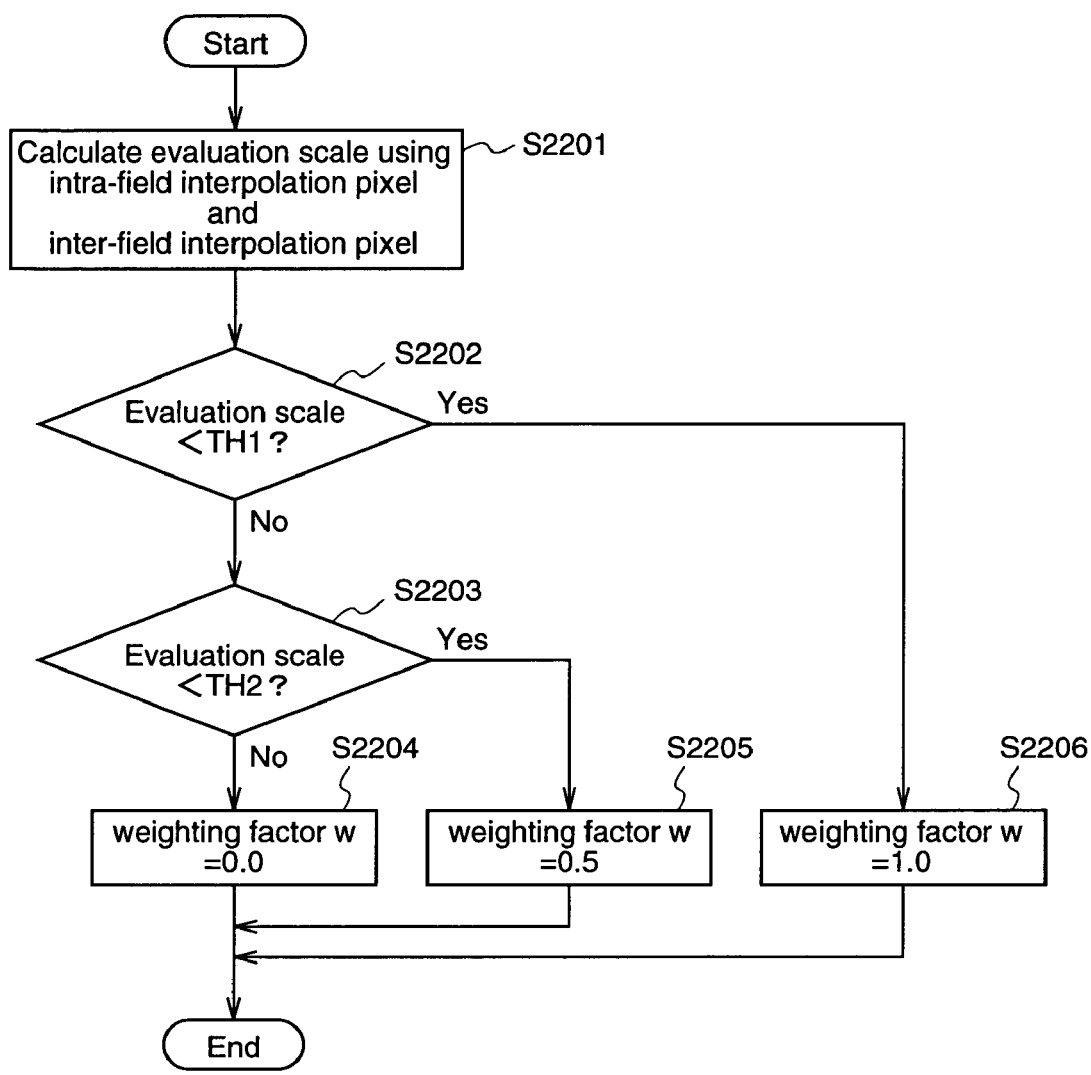
FIG. 22 is a flowchart for showing an operation of a weighting factor decision unit 606 according to embodiments of the present invention.

FIG. 22 is a flowchart for explaining the operation of the weighting factor decision unit 606. Initially, in step S2201, the evaluation scale is calculated by using the inter-field interpolation pixel that is inputted from the inter-field interpolation pixel generator 604 and the intra-field interpolation pixel that is inputted from the intra-field interpolation pixel generator 605. As the evaluation scale, for example, the sum of the absolute values of the differences between corresponding pixels, the maximum value of the absolute values of the differences, or the ratio of the mean values of pixels in a block is conceivable. Here, the case in which the sum of the absolute values of the differences between corresponding pixels is used as the evaluation scale will be described.

In steps S2202 and S2203, a comparison between the evaluation scale and a threshold is performed. When the evaluation scale (the sum of the absolute values of the differences between inter-field interpolation pixels and intra-field interpolation pixels) is smaller than a threshold TH1, the weighting factor "w" is set at "1.0" (step S2206). When the evaluation scale is equal to or larger than the threshold TH1 but smaller than a threshold TH2, the weighting factor "w" is set at "0.5" (step S2205). When the evaluation scale is equal to or larger than the threshold TH2, the weighting factor "w" is set at "0.0" (step S2204). Here, the relationship between TH1 and TH2 is that TH1<TH2. Then, the decided weighting factor is outputted to the progressive image generator 607. Here, the weighting factor "w" indicates a weight on intra-field interpolation.

The progressive image generator 607 receives the inter-field interpolation pixel block from the inter-field interpolation pixel generator 604, receives the intra-field interpolation pixel block from the intra-field interpolation pixel generator 605, and receives the weighting factor "w" from the weighting factor decision unit 606. Then, the sum of a value which is obtained by multiplying each pixel of the inter-field interpolation pixels by the weighting factor "w", and a value which is obtained by multiplying each pixel of the intra-field interpolation pixels by "1.0-weighting factor w" is obtained as the interpolation pixel. Then, the decoded image (interlaced image) that is inputted from the image memory 507 is interpolated by using the interpolation pixels, and a progressive image is generated and outputted.

As described above, according to this third embodiment, in the case where a code sequence that is obtained by coding an interlaced image using motion compensation is decoded and the decoded interlaced image is subjected to the deinterlacing into a progressive image, the motion vector converter 602 converts a motion vector for the motion compensation, which is obtained at the decoding, into a size in one field unit, the motion vector judgement unit 603 judges the effectiveness of the motion vector which has been converted in one field unit, and the inter-field interpolation pixel generator 604 obtains pixels from a reference field by using the motion vector which has been converted into the size in one field unit and the judgment result of the effectiveness of the motion vector so as to generate inter-field interpolation pixels for a deinterlacing target field. Therefore, more accurate interpolation pixels can be obtained from the closest field based on the motion vector which has been converted into the size in one field unit, and as a result, the quality of the image which has been subjected to the deinterlacing is improved.

In this third embodiment, the progressive image generator 607 obtains the weighted mean of the inter-field interpolation pixel and the intra-field interpolation pixel by using the weighting factor which is decided by the weighting factor decision unit 606 so as to generate the final interpolation pixel. Therefore, the risk of generating an erroneous interpolation pixel can be minimized.

Further, in this third embodiment, in a case where there are plural effective motion vectors when the inter-field interpolation pixel generator 604 generates the inter-field interpolation pixel, the inter-field interpolation pixel generator 604 calculates the evaluation scale for selecting a motion vector to be used for generating the inter-field interpolation pixel, and the inter-field interpolation pixel generator 604 selects an optimum motion vector for generating the inter-field interpolation pixel by using the obtained evaluation scale. Therefore, the motion vector which is more suitable for the deinterlacing can be used, and the quality of the image which has been subjected to the deinterlacing can be further improved.

In this third embodiment, when the intra-field interpolation pixel generator 605 generates the intra-field interpolation pixel, the intra-field interpolation pixel generator 605 detects the direction of an edge in an interpolation position where the interpolation pixel is to be generated by using pixels surrounding the interpolation position, and judges the reliability of the detected edge. When the reliability of the edge is equal to or larger than a predetermined value, the interpolation pixel is generated by using pixels which exist in the direction of the edge. On the other hand, when the reliability of the edge is smaller than the predetermined value, the interpolation pixel is generated by using pixels which exist in the upper and lower directions of the interpolation position. Therefore, the image quality of parts in the image which has been subjected to the deinterlacing, notably oblique lines and the like, can be improved.

Here, in this third embodiment, a code sequence of an interlaced image (MPEG video) which is coded by MPEG method is inputted, while an inputted code sequence may be coded by another method so as long as an interlaced image is predictive coded by using motion compensation.

In this third embodiment, the motion vector converter 602 converts the motion vector into a motion vector in one field unit, while the motion vector may be converted into a motion vector in one frame unit.

Further, according to this third embodiment, the motion vector converter 602 converts the motion vector into a motion vector in one field unit, while, at that time, the quantity of vertical motion may be restricted to the quantity of even pixels. In this case, the number of motion vectors which are judged to be invalid by the motion vector judgment unit 603 is reduced, thereby further improving the image quality.

Further, in this third embodiment, the effectiveness of the motion vector is judged by using the motion vector judgment unit 603, while all motion vectors may be decided to be effective without using the motion vector judgment unit 603.

Further, in this third embodiment, the motion vector judgment unit 603 judges whether the size of the motion vector that is converted by the motion vector converter 602 is smaller than a threshold, and judges whether the quantity of vertical motion is an even number. However, the judgment as to whether the size of the motion vector is smaller than the threshold may be made by using a motion vector value before being converted by the motion vector conversion unit 602.

In this third embodiment, as the method for calculating an evaluation scale for an obtained motion vector when the inter-field interpolation pixel generator 604 generates inter-field interpolation pixels, the first evaluation scale calculation method by which the sum of the absolute values of the differences between pixels of a reference field that is indicated by an effective motion vector which is judged to be effective by the motion vector judgement unit 603, and pixels of a reference field that is indicated by a motion vector which is in the opposite direction to the effective motion vector is used as the evaluation scale has been described. Further, as the method for calculating an evaluation scale for an obtained motion vector when the inter-field interpolation pixel generator 604 generates inter-field interpolation pixels, the second evaluation scale calculation method by which the sum of the absolute values of differences between pixels of a reference field that is indicated by an effective motion vector which is judged to be effective by the motion vector judgement unit 603 and interpolation pixels which are generated by the intra-field interpolation pixel generator 605 is used as the evaluation scale has also been described. However, other parameter such as the maximum value of the absolute values of the differences between corresponding pixels and the ratio of the mean values of pixels in a block may be used as the evaluation scale.

Further, in this third embodiment, when the inter-field interpolation pixel generator 604 generates inter-field interpolation pixels, the processing is carried out in units (blocks) each being composed of 8 pixels (horizontal)×4 pixels (vertical). However, the size of the block is not restricted thereto.

In this third embodiment, when the inter-field interpolation pixel generator 604 obtains the evaluation scale for the motion vector, the evaluation scales with respect to one direction, the opposite direction and the two directions of the motion vector are calculated. However, part of these evaluation scales may be calculated without needing to calculate all of the evaluation scales.

Further, in this third embodiment, when the intra-field interpolation pixel generator 605 obtains the direction of an edge, the absolute value of the differences between two pixels in the direction of the edge is used, while differences may be calculated by using peripheral pixels. For example, when an edge in the direction of pixels "m"–"p" in FIG. 20 is detected, the sum of the absolute values of the respective differences between corresponding pixels "i" and "o", pixels "m" and "p", and pixel "n" and "q" may be used. When the peripheral pixels are used for the calculation of the differences, an erroneous detection of the edge can be further prevented for an image including noises or an image having quite fine patterns.

Further, in this third embodiment, the intra-field interpolation pixel generator 605 generates interpolation pixels from two pixels, i.e., the number of taps in the filter at the time of interpolation pixel generation is two. The number of the taps, however, are not limited to two and may be other values.

Further, in this third embodiment, the intra-field interpolation pixel generator 605 finds the direction of an edge from five directions, while the number of directions is not limited to five and may be other values.

Further, in this third embodiment, the weighting factor "w" that is decided by the weighting factor decision unit 606 has three levels (1, 0.5, 0), while the weighting factor "w" is not limited to three levels and may have any number of levels.

Further, in this third embodiment, the weighting factor decision unit 606 uses the sum of the absolute values of the differences between the inter-field interpolation pixels and the intra-field interpolation pixels as the evaluation scale. However, the evaluation scale may be obtained by other methods, or the evaluation scale may be the maximum value of the absolute values of differences, the ratio of the mean values of pixels or the like. Further, the combination of these values may be used as the evaluation scale.

Furthermore, in this third embodiment, a decoded image is interpolated by using interpolation pixels which are generated from inter-field interpolation pixels that are generated by the inter-field interpolation pixel generator 604 and intra-field interpolation pixels which are generated by the intra-field interpolation pixel generator 605 so as to generate a progressive image. However, a decoded image may be interpolated by using only intra-field interpolation pixels which are generated by the intra-field interpolation pixel generator 605 so as to generate a progressive image. In this case, in the deinterlacing apparatus 508, only the intra-field interpolation pixel generator 605 and the progressive image generator 607 operate.

Fourth Embodiment

Hereinafter, a fourth embodiment of the present invention will be described.

In this fourth embodiment, a description will be given of a case where a deinterlacing target macroblock that is to be subjected to the deinterlacing is an intra-coded macroblock. As the intra-coded macroblock, a case where a macroblock in a frame of a P or B picture is intra-coded and a case where a frame itself is intra-coded (intra-frame) are conceivable. Since the intra-coded macroblock is usually not accompanied with a motion vector, a motion vector cannot be used for the deinterlacing. Thus, in this fourth embodiment, when a deinterlacing target macroblock in a frame of a P or B picture is intra-coded, motion vectors of surrounding macroblocks, or forward and backward frames are used for the deinterlacing. When a frame itself is intra-coded (intra-frame), motion vectors of forward and backward frames are used. The difference between this fourth embodiment and the third embodiment is the operation of the motion vector converter 602. Thus, the operation of the motion vector converter 602 in the fourth embodiment will now be described with reference to FIG. 23.

Figure 23:
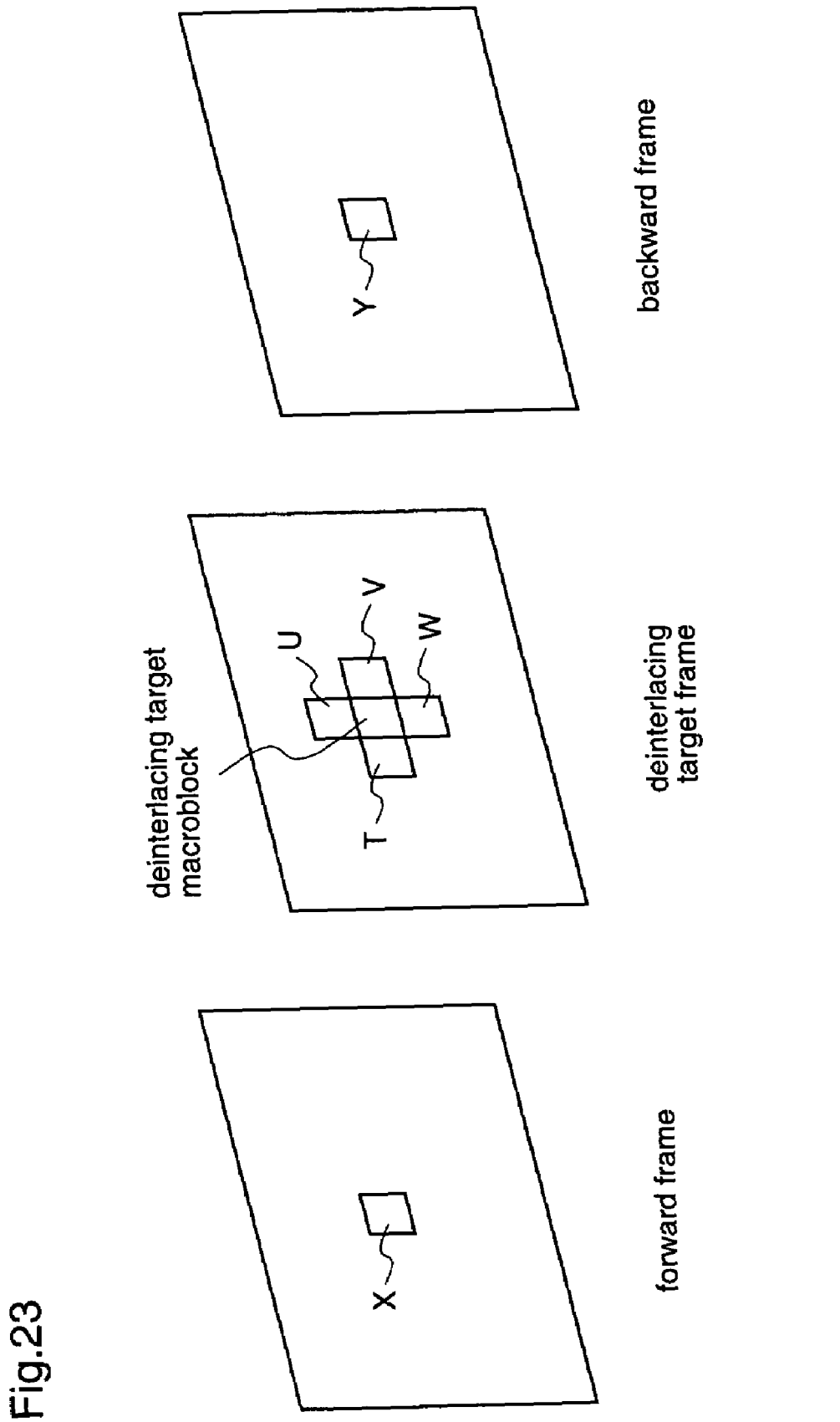
FIG. 23 is a diagram schematically showing a deinterlacing target frame including an intra-coded macroblock, and forward and backward frames.

FIG. 23 is a diagram schematically showing a deinterlacing target frame which includes an intra-coded macroblock and forward and backward frames.

The motion vector converter 602 reads a macroblock type of the deinterlacing target macroblock from the parameter memory 601. When it is known from the macroblock type that the deinterlacing target macroblock is intra-coded, a motion vector of another macroblock is obtained. Here, another macroblock indicates a peripheral macroblock in the same frame as the deinterlacing target macroblock, or a macroblock in a forward or backward frame, which is at the same position as that of the target macroblock. In FIG. 23, macroblocks T, U, V and W are peripheral macroblocks in the same frame. A macroblock X is a macroblock at the same position in the forward frame. A macroblock Y is a macroblock at the same position in the backward frame. When the deinterlacing target macroblock is subjected to the deinterlacing, a motion vector of one of these macroblocks or motion vectors of plural macroblocks can be used. When the deinterlacing target frame itself is intra-coded, the motion vector of a macroblock in a forward or backward frame, which is at the same position as that of the deinterlacing target macroblock, is used.

The motion vector converter 602 converts the size of the motion vector into a size in one field unit, and outputs the converted motion vector to the motion vector judgment unit 603. The conversion process of the motion vector converter 602 and processes subsequent to the operation of the motion vector judgment unit 603 are the same as in the third embodiment.

As described above, in this fourth embodiment, in a case where a code sequence which is obtained by coding an interlaced image by using motion compensation is decoded and a decoded interlaced image is subjected to the deinterlacing to be converted into a progressive image, when a deinterlacing target macroblock is intra-coded, the motion vector converter 602 converts a motion vector of a peripheral macroblock in the same frame or a macroblock in a forward or backward frame at the same position as that of the target macroblock into a size in one field unit, the motion vector judgment unit 603 judges the effectiveness of the motion vector which has been converted into the size in one field unit, and then the inter-field interpolation pixel generator 604 obtains a pixel from a reference field by using the motion vector which has been converted into the size in one field unit and the judgment result of the effectiveness of the motion vector so as to generate an inter-field interpolation pixel for the deinterlacing target field. Therefore, even when the deinterlacing target macroblock is an intra-coded macroblock, an inter-field interpolation pixel can be generated with high accuracy without the need for the detection of the motion.

Fifth Embodiment

Figure 24:
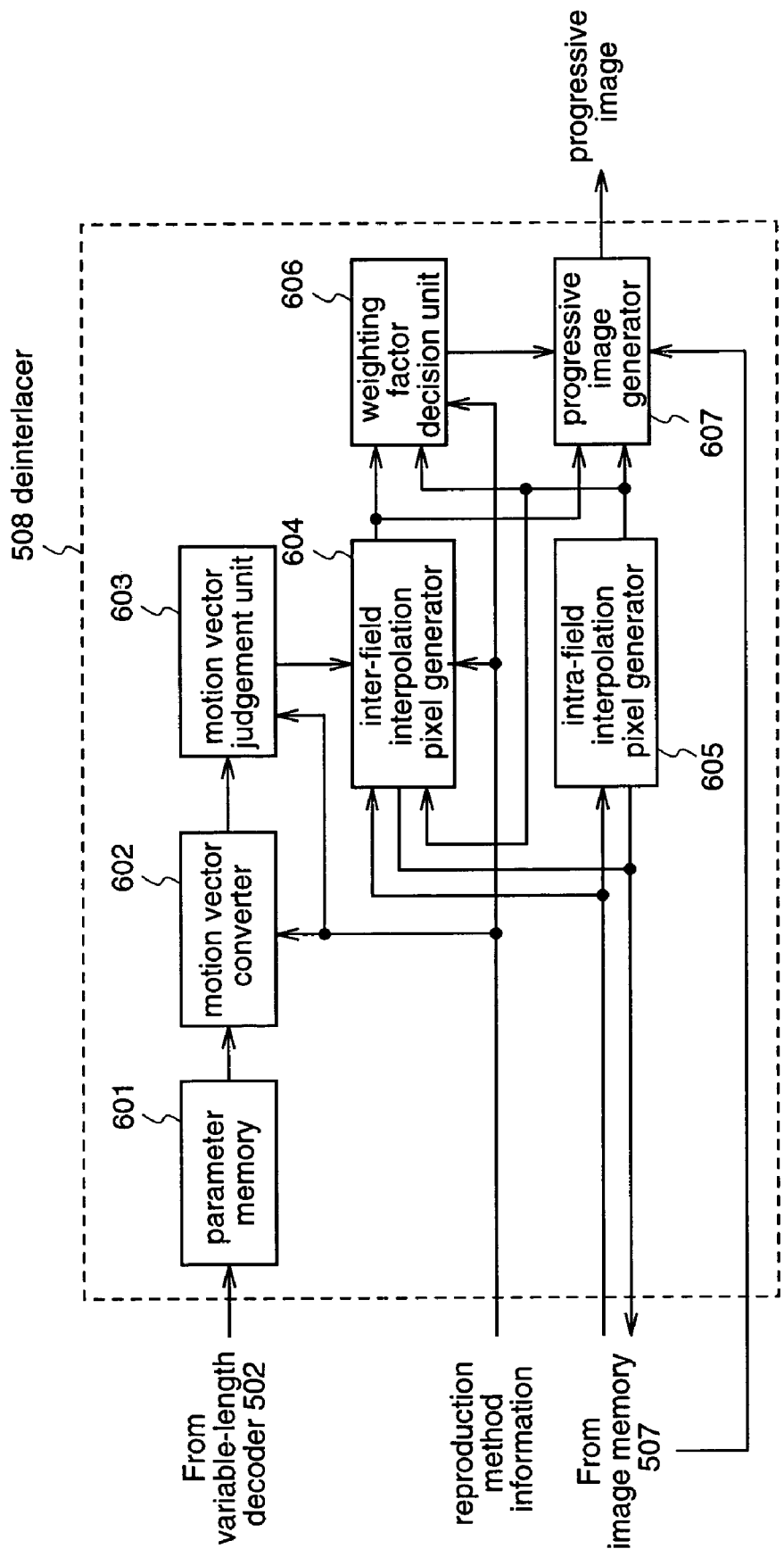
FIG. 24 is a block diagram illustrating a structure of a deinterlacer 508 according to a fifth embodiment of the present invention.
Figure 25:
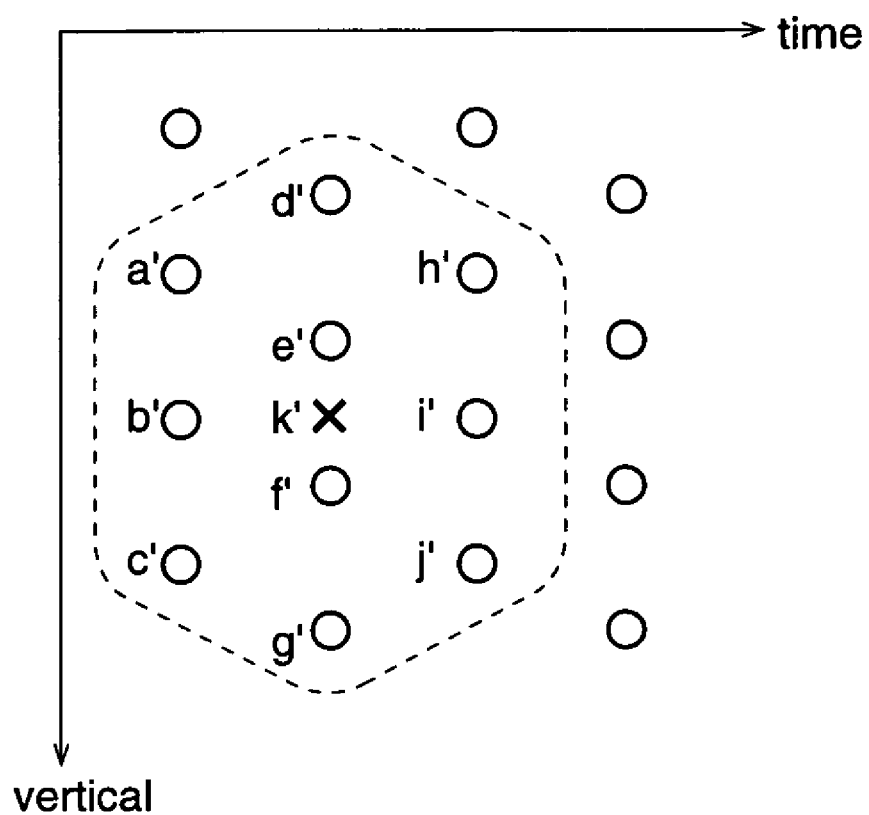
FIG. 25 is a diagram schematically illustrating an interlaced image for explaining a prior art deinterlacing method.

A fifth embodiment of the present invention will be described with reference to FIG. 24.

In this fifth embodiment, the description is given of deinterlacing in a case where an MPEG video code sequence inputted by the MPEG video decoder 501 is a code sequence which has been read from a recording medium in a fast-forward or fast-rewind mode. Usually, when an MPEG stream is read in the fast-forward or fast-rewind mode from a recording medium which contains the MPEG stream, only I pictures are read out or only I and P pictures are read out. To be more specific, when only I pictures are read, the inputted code sequence is a code sequence including only I picture data, and when only I and P pictures are read, the inputted code sequence is a code sequence including only I and P picture data. Thus, when the MPEG video code sequence inputted by the MPEG video decoder 501 is a code sequence which has been read from the recording medium in the fast-forward or fast-rewind mode, the deinterlacer 508 cannot obtain a pixel from an adjacent field using a motion vector and generate an inter-field interpolation pixel, to perform the deinterlacing. Therefore, in this fifth embodiment, when the deinterlacer 508 receives reproduction method information indicating that the MPEG video code sequence inputted by the MPEG video decoder 501 is a code sequence which has been read from the recording medium in the fast-forward or fast-rewind mode, the progressive image generator 607 generates a progressive image by using only an intra-field interpolation pixel. That is, the motion vector converter 602 reads no motion vector from the parameter memory 601. Thus, the motion vector judgement unit 603 and the inter-field interpolation pixel generator 604 does not carry out any processing. Further, the weighting factor decision unit 606 outputs the weighting factor "0" to the progressive image generator 607 (i.e., an intra-field interpolation pixel is used as it is as an interpolation pixel). Then, the progressive image generator 607 uses the intra-field interpolation pixel that is outputted from the intra-field interpolation pixel generator 605 in its current form as the interpolation pixel so as to generate a progressive image.

As described above, in this fifth embodiment, when an MPEG video code sequence that is inputted by the MPEG video decoder 501 is a code sequence which has been read from a recording medium in the fast-forward or fast-rewind mode, the progressive image generator 607 generates an interpolation pixel only from an intra-field interpolation pixel that is generated by the intra-field interpolation pixel generator 605, and uses the generated interpolation pixel so as to generate a progressive image. Therefore, even when the inputted code sequence is a code sequence which has been read from the recording medium in the fast-forward or fast-rewind mode, the deinterlacing process can be performed without requiring a new component and enlarging the circuit scale. In the case of fast-forward or fast-rewind mode, reproduced images are changed at high speeds, and as a result, the degradation of vertical resolution is not conspicuous even when the interpolation pixel is generated only with the intra-field interpolation pixel.

As described above, according to the deinterlacing method and the deinterlacing apparatus of the present invention, when an interlaced image is to be converted into a progressive image, pixels of a deinterlacing target field and forward and backward fields are subjected to the VT filtering so as to generate an interpolation pixel. At that time, the sum of the absolute values of the differences between pixels of a deinterlacing target field or frame including the target field, and the immediately preceding and immediately following fields or frames is obtained, and the coefficient of the VT filter is decided based on the sum of the absolute values. The coefficient is decided so that the image is judged to be a moving picture when the sum of the absolute values of the differences is larger, and the contribution (gain) from the adjacent fields is reduced. Therefore, in the case of a still picture, a progressive image of high resolution can be obtained similar to the case of using the prior art VT filter, and in the case of a moving picture, the image quality of a part where the image quality is degraded by the prior art VT filter can be greatly improved. Further, these operations can be implemented by one filter, and as a result, the costs can be reduced.

According to the deinterlacing method and the deinterlacing apparatus of the present invention, when an interlaced image is to be converted into a progressive image, pixels of a deinterlacing target field and forward and backward fields are subjected to the VT filtering so as to generate an interpolation pixel. At that time, the absolute value of the difference between pixels of adjacent fields in the vicinity of a position to be interpolated is calculated, and the coefficient of the VT filter is decided based on the calculated absolute value. The coefficient is decided so that the image is judged to be a moving picture when the absolute value of the difference is larger, and then the contribution from the adjacent fields is reduced. Therefore, in the case of a still picture, a progressive image of high resolution can be obtained similar to the case of using the prior art VT filter. However, when there is a moving object or the like in the screen, the image quality degradation that is caused by the prior art VT filter can be prevented for that object. Further, these operations can be implemented by one filter, and as a result, the costs can be reduced.

According to the deinterlacing method and the deinterlacing apparatus of the present invention, a code sequence which is obtained by coding an interlaced image using motion compensation is decoded, a decoded image of the interlaced image and a motion vector at the motion compensation are obtained, the motion vector is converted into a size in one field unit, the effectiveness of the motion vector which has been converted into the size in one field unit is judged, and a pixel is obtained from a reference field based on the motion vector and the judgement result of the motion vector so as to generate an inter-field interpolation pixel for the deinterlacing target field, an intra-field interpolation pixel is generated by using a pixel in the deinterlacing target field, the weighted mean of the inter-field interpolation pixel and the intra-field interpolation pixel is obtained with a weighting factor so as to generate an interpolation pixel, and the decoded image is interpolated by using the interpolation pixel so as to generate a progressive image. Therefore, a more accurate interpolation pixel can be obtained from the closest field based on the motion vector which has been converted into the size in one field unit so as to improve the quality of the image which has been subjected to the deinterlacing. In addition, the final interpolation pixel is generated from the weighted mean of the inter-field interpolation pixel and the intra-field interpolation pixel, and further, the weight is decided from the difference between the inter-field interpolation pixel and the intra-field interpolation pixel. Therefore, the risk of generating an erroneous interpolation pixel can be minimized.

Further, according to the deinterlacing method and the deinterlacing apparatus of the present invention, in a case where there are plural effective motion vectors which can be used for generating the inter-field interpolation pixel, an evaluation scale for selecting a motion vector to be used for generating the inter-field interpolation pixel is calculated, and an optimum motion vector for the field interpolation process is selected by using the obtained evaluation scale. Therefore, the motion vector which is more suitable for the deinterlacing can be used, and the quality of the image which has been subjected to the deinterlacing can be further improved.

Further, according to the deinterlacing method and the deinterlacing apparatus of the present invention, when an intra-field interpolation pixel is generated, the direction of an edge in an interpolation position where an interpolation pixel is to be generated is detected by using peripheral pixels, and the reliability of the detected edge is judged. When the reliability of the edge is equal to or larger than a predetermined value, the interpolation pixel is generated by using pixels existing in the direction of the edge. Conversely, when the reliability of the edge is smaller than the predetermined value, the interpolation pixel is generated by using pixels existing in the upper and lower directions of the interpolation position. Therefore, the image quality of parts in the image which has been subjected to the deinterlacing, notably oblique lines and the like, can be improved.

Further, according to the deinterlacing method and the deinterlacing apparatus of the present invention, in a case where a code sequence which is obtained by coding an interlaced image using motion compensation is decoded and a decoded image of the interlaced image and a motion vector at the motion compensation are obtained, when a deinterlacing target macroblock is intra-coded, a motion vector of a peripheral macroblock in the same frame or a macroblock in a forward or backward frame at the same position as that of the target macroblock is converted into a size in one field unit, the effectiveness of the motion vector which has been converted into the size in one field unit is judged, an inter-field interpolation pixel for the deinterlacing target field is generated from a pixel that is obtained from a reference field by using the motion vector and the judgement result of the motion vector, an intra-field interpolation pixel is generated by using a pixel in the deinterlacing target field, a weighted sum of the inter-field interpolation pixel and the intra-field interpolation pixel is obtained by using a weighting factor so as to generate an interpolation pixel, and the decoded image is interpolated by using the generated interpolation pixel so as to generate a progressive image. Therefore, even when an image is an intra-coded image, an inter-field interpolation pixel can be generated at a high accuracy without the need for motion detection, and as a result, the quality of the image which has been subjected to the deinterlacing is improved.

Further, according to the deinterlacing method and the deinterlacing apparatus of the present invention, when an inputted code sequence is a code sequence which has been read from a recording medium in the fast-forward or fast-rewind mode, only an intra-field interpolation pixel is generated, and a progressive image is generated by using only the generated intra-field interpolation pixel. Therefore, a code sequence which has been read from the recording medium in the fast-forward or fast-rewind mode can be subjected to the deinterlacing without requiring a new component and without enlarging the circuit scale.

What is claimed is:

1. A deinterlacing method for converting an interlaced image into a progressive image, said method comprising:
    performing a filtering process to pixels of at least one of three fields, a deinterlacing target field to be subjected to a deinterlacing process and forward and backward fields of the deinterlacing target field within the interlaced image so as to generate an interpolation pixel for the deinterlacing target field;
    measuring a quantity of motion of the deinterlacing target field; and
    changing a filter coefficient of a filter used in the filtering process based on the quantity of the motion measured in said measuring of the quantity of motion,
    wherein in said changing of the characteristics of the filtering, the characteristics of the filtering are changed so that gain of components from the forward and backward fields of the deinterlacing target field is reduced as the quantity of the motion measured in said measuring of the quantity of motion is increased.

2. The deinterlacing method of claim 1, wherein a filter which is used in said performing of the filtering process so as to generate the interpolation pixel has characteristics of extracting vertical low frequency components of the deinterlacing target field, and extracting vertical high frequency components of the forward and backward fields of the deinterlacing target field.

3. The deinterlacing method of claim 1, wherein in said performing of the filtering process so as to generate the interpolation pixel, pixels in the deinterlacing target field or peripheral fields, which are in the same horizontal position as that of a position to be interpolated, are subjected to the filtering process.

4. The deinterlacing method of claim 1, wherein in said measuring of the quantity of the motion, the quantity of the motion is obtained from a difference between the deinterlacing target field or a frame including the deinterlacing target field, and another field or frame.

5. The deinterlacing method of claim 1, wherein in said measuring of the quantity of the motion, the quantity of the motion is obtained from a difference between the pixels which are used when the filtering process is performed in said performing of the filtering process so as to generate the interpolation pixel.

6. The deinterlacing method of claim 5, wherein in said measuring of the quantity of the motion, the quantity of the motion is obtained from a difference between pixels which are included in the forward and backward fields of the deinterlacing target field from among the pixels which are used when the filtering process is performed in said performing of the filtering process so as to generate the interpolation pixel.

7. A deinterlacing method for converting an interlaced image into a progressive image, said method comprising:
    performing a filtering process to pixels of at least one of three fields, a deinterlacing target field to be subjected to a deinterlacing process and forward and backward fields of the deinterlacing target field within the interlaced image so as to generate an interpolation pixel for the deinterlacing target field;
    measuring a quantity of motion of the deinterlacing target field; and
    changing a filter coefficient of a filter used in the filtering process based on the quantity of the motion measured in said measuring of the quantity of motion,
    wherein in said changing of the characteristics of the filtering, the characteristics of the filtering are changed so that gain of components from the forward and backward fields of the deinterlacing target field is reduced to zero when the quantity of the motion measured in said measuring of the quantity of motion is increased.

8. A deinterlacing apparatus for converting an interlaced image into a progressive image, said apparatus comprising:
    a frame memory for storing the interlaced image;
    a filter unit for receiving, from said frame memory, a deinterlacing target field to be subjected to a deinterlacing process and one or both of forward and backward fields of the deinterlacing target field within the interlaced image, and performing a filtering process to pixels of at least one of the received fields so as to generate an interpolation pixel for the interlacing target field;
    a difference operation unit for receiving, from said frame memory, the deinterlacing target field or a frame including the deinterlacing target field, and a field or frame which is adjacent to the deinterlacing target field or frame including the deinterlacing target field within the interlaced image and operating a difference therebetween so as to measure a quantity of motion of the deinterlacing target field;
    a filter coefficient setting unit for changing filter characteristics of said filter unit based on the quantity of the motion measured by said difference operation unit; and
    a double-speed converter for composing the interlaced image and the interpolation pixel generated by said filter unit, and generating the progressive image.

9. A deinterlacing method for performing a decoding process to a code sequence, field by field or frame by frame, which code sequence is obtained by coding an interlaced image composed of plural fields using motion compensation, and converting a decoded image of the interlaced image, which is obtained by the decoding process, into a progressive image, said method comprising:
    decoding the interlaced image so as to obtain the decoded image and to obtain a motion vector at the motion compensation which indicates a prescribed reference field for a target field;
    converting a motion vector for each of the fields, having a size corresponding to a time interval between the target field and the prescribed reference field, into a motion vector of a size corresponding to a time interval of a fixed unit;
    obtaining pixels from reference fields which are forward and backward fields of a deinterlacing target field to be subjected to a deinterlacing process based on the motion vectors converted in said converting of the motion vector, and generating a first interpolation pixel for the deinterlacing target field;
    generating a second interpolation pixel by using pixels in the deinterlacing target field;
    deciding a weighting factor which indicates a weighting ratio between the first interpolation pixel and the second interpolation pixel; and
    obtaining a weighted mean of the first interpolation pixel and the second interpolation pixel by using the weighting factor decided in said deciding of the weighting factor so as to generate a third interpolation pixel, and interpolating the decoded image by using the third interpolation pixel so as to generate the progressive image.

10. A deinterlacing method for performing a decoding process to a code sequence, field by field or frame by frame, which code sequence is obtained by coding an interlaced image composed of plural fields using motion compensation, and converting an decoded image of the interlaced image, which is obtained by the decoding process, into a progressive image, said method comprising:
    decoding the interlaced image so as to obtain the decoded image and to obtain a motion vector at the motion compensation which indicates a prescribed reference field for a target field;
    a converting a motion vector for each of the fields having a size corresponding to a time interval between the target field and the prescribed reference field into a motion vector of a size corresponding to a time interval of a fixed unit;
    judging an effectiveness of the motion vectors converted in said converting of the motion vector;
    obtaining pixels from reference fields which are forward and backward fields of a deinterlacing target field to be subjected to a deinterlacing process based on the motion vectors converted in said converting of the motion vector and a result of the judgment in said judging of the effectiveness of the motion vectors, and generating a first interpolation pixel for the deinterlacing target field;

generating a second interpolation pixel by using pixels in the deinterlacing target field;

deciding a weighting factor which indicates a weighting ratio between the first interpolation pixel and the second interpolation pixel; and obtaining a weighted mean of the first interpolation pixel and the second interpolation pixel by using the weighting factor so as to generate a third interpolation pixel, and interpolating the decoded image by using the third interpolation pixel so as to generate the progressive image.

11. The deinterlacing method of claim 9 or 10, wherein the time interval of a fixed unit in said converting of the motion vector is a time interval which is equivalent to one field.

12. The deinterlacing method of claim 9 or 10, wherein processes in said generating of the first interpolation pixel, the deciding of the weighting factor and said obtaining of the weighted mean and interpolating of the decoded image so as to generate the progressive image are carried out in units, which unit is smaller than a unit of an image accompanied by the motion vector at the motion compensation.

13. The deinterlacing method of claim 9 or 10, wherein the code sequence is a code sequence which is coded by an MPEG method.

14. The deinterlacing method of claim 9 or 10, wherein in said converting of the motion vector, when a distance between lines in a frame structure is one pixel, the motion vector is converted so that vertical components of the motion vector have an even number.

15. The deinterlacing method of claim 9 or 10, wherein said generating of the second interpolation pixel includes:

detecting a direction indicated by a line passing through a position to be interpolated where the second interpolation pixel is generated, and connecting peripheral pixels of the position to be interpolated, as a direction of an edge;

obtaining a strongness of a correlation between pixels existing in the direction of the edge, as a reliability of the edge; and generating the second interpolation pixel by using the pixels existing in the direction of the edge when the reliability of the edge is equal to or larger than a predetermined value, and generating the second interpolation pixel by using pixels existing in upper and lower directions of the position to be interpolated when the reliability of the edge is smaller than the predetermined value.

16. The deinterlacing method of claim 9 or 10, wherein for an intra-coded deinterlacing target image area in the deinterlacing target field, the deinterlacing process is performed in said obtaining of pixels from reference fields which are forward and backward fields of the deinterlacing target field by using a motion vector which accompanies a peripheral image area positioned around the deinterlacing target image area or an image area in a frame immediately preceding or immediately following the deinterlacing target field, which image area is at the same position as that of the deinterlacing target image area.

17. The deinterlacing method of claim 9 or 10, wherein, when the code sequence which is decoded in said decoding of the interlaced image is recorded on a recording medium and read in a fast-forward or fast-rewind mode, the decoded image is interpolated by using only the second interpolation pixel generated in said generating of the second interpolation pixel so as to generate the progressive image.

18. The deinterlacing method of claim 10, wherein in said judging of the effectiveness of the motion vector, when the size of the motion vector converted in said converting of the motion vector is equal to or smaller than a predetermined value, the motion vector is judged to be effective.

19. The deinterlacing method of claim 10, wherein in said judging of the effectiveness of the motion vector, when a distance between lines in a frame structure is one pixel, a motion vector which has even-numbered vertical components from among the motion vectors converted in said converting of the motion vector is judged to be effective.

20. The deinterlacing method of claim 9, wherein in said obtaining of the pixels and generating of the first interpolation pixel, an evaluation scale for selecting an optimum motion vector for the generation of the first interpolation pixel is calculated by using the motion vectors converted in said converting of the motion vector, and the first interpolation pixel is generated by using a motion vector with which the best evaluation scale is obtained.

21. The deinterlacing method of claim 9, wherein in said obtaining of the pixels and generating of the first interpolation pixel, an evaluation scale for selecting an optimum motion vector for the generation of the first interpolation pixel is calculated by using the motion vector converted in said converting of the motion vector and a motion vector in the opposite direction to the motion vector, and the first interpolation pixel is generated by using a motion vector with which the best evaluation scale is obtained, and the motion vector in the opposite direction is a motion vector which is in the opposite direction to the motion vector converted in said converting of the motion vector, and indicates a reference field in an opposite forward/backward relationship to the reference field indicated by the motion vector with respect to the target field.

22. The deinterlacing method of claim 10, wherein in said obtaining of the pixels and generating of the first interpolation pixel, an evaluation scale for selecting, from among the motion vectors converted in said converting of the motion vector, an optimum motion vector for the generation of the first interpolation pixel is calculated by using a motion vector which is judged to be effective in said judging of the effectiveness of the motion vectors, and the first interpolation pixel is generated in said obtaining of the pixels and generating of the first interpolation pixel by using a motion vector with which the best evaluation scale is obtained.

23. The deinterlacing method of claim 10, wherein said obtaining of the pixels and generating of the first interpolation pixel, an evaluation scale for selecting, from among the motion vectors converted in said converting of the motion vector, an optimum motion vector for the generation of the first interpolation pixel is calculated by using an effective motion vector which is judged to be effective in said judging of the effectiveness of the motion vectors and a motion vector in the opposite direction to the effective motion vector, and the first interpolation pixel is generated in said obtaining of the pixels and generating of the first interpolation pixel by using a motion vector with which the best evaluation scale is obtained, and the motion vector in the opposite direction is a motion vector which is in the opposite direction to the effective motion vector, and indicates a reference field in an opposite forward/backward relationship to the reference field indicated by the effective motion vector with respect to the target field.

24. The deinterlacing method of any one of claims 20 to 23, wherein in said obtaining of the pixels and generating of the first interpolation pixel, an evaluation scale for selecting an optimum motion vector for the generation of the first interpolation pixel is calculated by using the motion vector converted in said converting of the motion vector and a motion vector having no motion, and the first interpolation pixel is generated in said obtaining of the pixels and generating of the first interpolation pixel by using a motion vector with which the best evaluation scale is obtained.

25. The deinterlacing method of any one of claims 20 to 23, wherein the evaluation scale is a sum of absolute values of differences between pixels of the reference field which is indicated by the motion vector converted in said converting of the motion vector and the second interpolation pixels.

26. The deinterlacing method of claim 24, wherein the evaluation scale is a sum of absolute values of differences between pixels of the reference field which is indicated by the motion vector converted in said converting of the motion vector and the second interpolation pixels.

27. The deinterlacing method of any one of claims 21 to 23, wherein the evaluation scale is a sum of absolute values of differences between pixels of the reference field which is indicated by the motion vector converted in said converting of the motion vector and pixels of a reference field which is indicated by the motion vector in the opposite direction.

28. The deinterlacing method of any one of claims 21 to 23, wherein
in said obtaining of the pixels and generating of the first interpolation pixel, an evaluation scale for selection an optimum motion vector for the generation of the first interpolation pixel is calculated by using the motion vector converted in said converting of the motion vector and a motion vector having no motion, and the first interpolation pixel is generated in said obtaining of the pixels and generating of the first interpolation pixel by using a motion vector with which the best evaluation scale is obtained, and
the evaluation scale is a sum of absolute values of differences between pixels of the reference field which is indicated by the motion vector converted in said converting of the motion vector and pixels of the reference field which is indicated by the motion vector of the opposite direction.

29. The deinterlacing method of claim 15, wherein in said obtaining of the strongness of the correlation between pixels existing in the direction of the edge, when a difference between the pixels existing in the direction of the edge is smaller than a difference between the pixels existing in the upper and lower directions of the position to be interpolated, the reliability of the edge is judged to be equal to or larger than the predetermined value.

30. The deinterlacing method of claim 15 wherein in said obtaining of the strongness of the correlation between pixels existing in the direction of the edge, when the interpolation pixel value which is obtained by using the pixels in the direction of the edge is a value between values of the pixels existing in the upper and lower directions of the position to be interpolated, the reliability of the edge is judged to be equal to or larger than the predetermined value.

31. A deinterlacing method for generating an interpolation pixel for an interlaced image which is composed of plural fields, using pixels in each of the fields, and converting the interlaced image into a progressive image, said method comprising:
detecting a direction indicated by a line passing through a position to be interpolated where the interpolation pixel is generated and connecting peripheral pixels of the position to be interpolated, as a direction of an edge;
obtaining a strongness of a correlation between pixels existing in the direction of the edge, as a reliability of the edge; and
generating the interpolation pixel by using the pixels existing in the direction of the edge when the reliability of the edge is equal to or larger than a predetermined value, and generating the interpolation pixel by using pixels existing in upper and lower directions of the position to be interpolated when the reliability of the edge is smaller than the predetermined value.

32. The deinterlacing method of claim 31, wherein in said obtaining of the strongness of the correlation between pixels existing in the direction of the edge, when a difference between the pixels existing in the direction of the edge is smaller than a difference between the pixels existing in the upper and lower directions of the position to be interpolated, the reliability of the edge is judged to be equal to or larger than the predetermined value.

33. The deinterlacing method of claim 31, wherein in said obtaining of the strongness of the correlation between pixels existing in the direction of the edge, when the interpolation pixel value which is obtained by using the pixels existing in the direction of the edge is a value between values of the pixels existing in the upper and lower directions of the position to be interpolated, the reliability of the edge is judged to be equal to or larger than the predetermined value.

34. A deinterlacing apparatus for performing a decoding process to a code sequence obtained by coding an interlaced image which is composed of plural fields using motion compensation, field by field or frame by frame, and converting a decoded image of the interlaced image, which is obtained by the decoding process, into a progressive image, said apparatus comprising:
a decoder for decoding the interlaced image so as to obtain the decoded image and to obtain a motion vector at the motion compensation which indicates a prescribed reference field for a target field;
an image memory for storing the decoded image;
a parameter memory for storing the motion vector;
a motion vector converter for converting a motion vector for each of the fields, having a size corresponding to a time interval between the target field and the prescribed reference field, which is read from said parameter memory, into a motion vector of a size corresponding to a time interval of a fixed unit;
an inter-field interpolation pixel generator for obtaining pixels from reference fields which are forward and backward fields of a deinterlacing target field to be subjected to a deinterlacing process based on the motion vectors converted by said motion vector converter, and generating a first interpolation pixel for the deinterlacing target field;
an intra-field interpolation pixel generator for generating a second interpolation pixel by using pixels in the deinterlacing target field;
a weighting factor decision unit for deciding a weighting factor which indicates a weighting ratio between the first interpolation pixel and the second interpolation pixel; and a progressive image generator for obtaining a weighted mean of the first interpolation pixel and the second interpolation pixel by using the weighting factor so as to generate a third interpolation pixel, and interpolating the decoded image read from said image memory by using the third interpolation pixel so as to generate the progressive image.

35. A deinterlacing apparatus for performing a decoding process to a code sequence obtained by coding an interlaced image which is composed of plural fields using motion compensation, field by field of frame by frame, and converting a decoded image of the interlaced image, which is obtained by the decoding process, into a progressive image, said apparatus comprising:

a decoder for decoding the interlaced image so as to obtain the decoded image and to obtain a motion vector at the motion compensation which indicates a prescribed reference field for a target field;

an image memory for storing the decoded image;

a parameter memory for storing the motion vector;

a motion vector converter for converting a motion vector for each of the fields, having a size corresponding to a time interval between the target field and the prescribed reference field, which is read from said parameter memory, into a motion vector of a size corresponding to a time interval of a fixed unit;

a motion vector judgment unit for judging an effectiveness of the motion vectors converted by said motion vector converter;

an inter-field interpolation pixel generator for obtaining pixels from reference fields which are forward and backward fields of a deinterlacing target field to be subjected to a deinterlacing process based on the motion vectors converted by said motion vector converter and a result of the judgment by said motion vector judgment unit, and generating a first interpolation pixel for the deinterlacing target field;

an intra-field interpolation pixel generator for reading pixels in the deinterlacing target field so as to generate a second interpolation pixel;

a weighting factor decision unit for deciding a weighting factor which indicates a weighting ratio between the first interpolation pixel and the second interpolation pixel; and a progressive image generator for obtaining a weighted mean of the first interpolation pixel and the second interpolation pixel by using the weighting factor so as to generate a third interpolation pixel, and interpolating the decoded image read from said image memory by using the third interpolation pixel so as to generate the progressive image.

* * * * *

UNITED STATES PATENT AND TRADEMARK OFFICE
CERTIFICATE OF CORRECTION

| | | |
|---|---|---|
| PATENT NO. | : 7,116,372 B2 | |
| APPLICATION NO. | : 09/981794 | |
| DATED | : October 3, 2006 | |
| INVENTOR(S) | : Satoshi Kondo et al. | |

It is certified that error appears in the above-identified patent and that said Letters Patent is hereby corrected as shown below:

On the Front Page
Under U.S. Patent Documents, right column, line 12, please change "6,757,022 B1" to --6,757,022 B2--.

Claim 30
In column 39, line 56, please change "of claim 15 wherein" to --of claim 15, wherein--.

Signed and Sealed this

Twentieth Day of March, 2007

JON W. DUDAS
*Director of the United States Patent and Trademark Office*